US008126691B2

(12) United States Patent
Ciolfi et al.

(10) Patent No.: US 8,126,691 B2
(45) Date of Patent: *Feb. 28, 2012

(54) SYSTEM AND METHOD FOR BLOCK DIAGRAM SIMULATION CONTEXT RESTORATION

(75) Inventors: John Ciolfi, Wellesley, MA (US); Pieter J. Mosterman, Framingham, MA (US)

(73) Assignee: The MathWorks, Inc., Natick, MA (US)

( * ) Notice: Subject to any disclaimer, the term of this patent is extended or adjusted under 35 U.S.C. 154(b) by 140 days.

This patent is subject to a terminal disclaimer.

(21) Appl. No.: 11/894,681

(22) Filed: Aug. 21, 2007

(65) Prior Publication Data

US 2008/0059739 A1   Mar. 6, 2008

Related U.S. Application Data

(63) Continuation of application No. 10/639,044, filed on Aug. 11, 2003, now Pat. No. 7,801,715.

(51) Int. Cl.
 *G06F 17/50* (2006.01)
(52) U.S. Cl. ........................................................ 703/13
(58) Field of Classification Search ...................... 703/13
 See application file for complete search history.

(56) References Cited

U.S. PATENT DOCUMENTS

| 5,566,295 | A |   | 10/1996 | Cypher et al. |
| 5,838,949 | A | * | 11/1998 | Hassoun ........................ 703/13 |
| 5,987,242 | A |   | 11/1999 | Bentley et al. |
| 6,063,128 | A |   | 5/2000  | Bentley et al. |
| 6,173,241 | B1 |  | 1/2001  | Trimberger |
| 6,961,688 | B2 |  | 11/2005 | Bankes |
| 7,178,112 | B1 |  | 2/2007  | Ciolfi et al. |
| 2004/0210592 | A1 | | 10/2004 | Ciolfi et al. |
| 2006/0117274 | A1 | * | 6/2006 | Tseng et al. ...................... 716/1 |

OTHER PUBLICATIONS

Simulink "Model-Based and System-Based Design", Version 5 (Jul. 2002).*
Bozin, A.S., "Electrical Power Systems Modeling and Simulation Using Simulink," IEEE Colloquium on the Use of Systems Analysis and Modeling Tools Experiences and Applications, pp. 10/1-10/8 (1998).
Hayder, M.E. et al., "Three Parallel Programming Paradigms: Comparisons on an archetypal PDE Computation," *Progress in Computer Research*, Nova Science Publishers, Inc., pp. 17-38 (2001).

(Continued)

*Primary Examiner* — Paul Rodriguez
*Assistant Examiner* — Andre Pierre Louis
(74) *Attorney, Agent, or Firm* — Nelson Mullins Riley & Scarborough LLP

(57) ABSTRACT

A method of saving portions of a simulation or execution engine image at various points in a simulation or execution is disclosed. The saving of the simulation or execution context in addition to the more traditional saving of the system state information enables the restoration of a simulation or execution that is capable of producing, in a subsequent simulation or execution of a block diagram continuing from the point of the saved simulation or execution, results that are identical to those of the initial simulation or execution. The ability to restore more than just system state variables enables a user to run multiple variations of a simulation from a given point without having to replicate the simulation up until the point of the saved initial simulation, and the ability to run multiple iterations of a block diagram execution in a non-simulation execution from a given point without having to replicate the execution of the block diagram up until that point.

19 Claims, 31 Drawing Sheets

OTHER PUBLICATIONS

Höpler, Robert et al., "Model Integrated Computing in Robot Control to Synthesize Real-time Embedded Code," *Proceedings of the 2001 IEEE International Conference on Control Applications*, (2001).

Mathworks, Inc., "Using Simulink, Version 2.2," The Mathworks, Inc., pp. 1-10-1-13, 3-35-3-42, 4-2-4-23, 8-2-8-5, 8-46-8-47, 8-63-8-27, 9-25-9-27, 9-61-9-62, 9-144-9-148, 12-2-12-13 (1998).

Quinn, Michael J. et al., "Preliminary Results from a Parallel MATLAB Compiler," *Proceedings of the First Merged International Symposium on Parallel and Distributed Processing*, pp. 81-87 (1998).

Silberschatz, Abraham et al., "Operating System Concepts," 5th Edition, John Wiley & Sons, Inc., pp. 42-43, 89-97 and 847 (1999).

* cited by examiner

Sorted List:

0:0 Sine Wave 1
0:1 Sine Wave 2
0:2 Function-Call Generator
0:3 Function-Call Subsystem
0:4 Integrator
0:5 Gain (algebraic id 0#1)
0:6 Sum (algebraic variable for id 0#1)
0:7 Out1

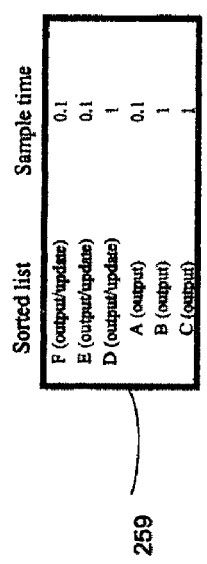
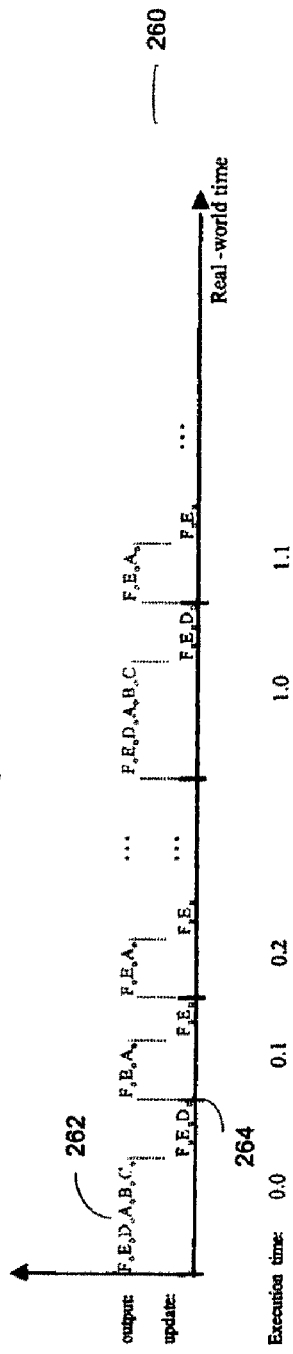
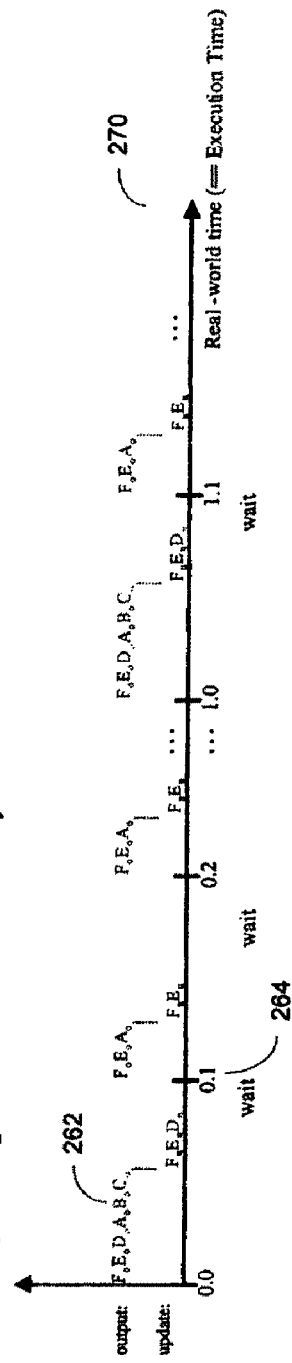
Figure 11B

SYSTEM AND METHOD FOR BLOCK DIAGRAM SIMULATION CONTEXT RESTORATION

CROSS-REFERENCES

This application is a continuation of U.S. patent application Ser. No. 10/639,044 filed Aug. 11, 2003 titled, "A System and Method for Block Diagram Simulation Context Restoration," now U.S. Pat. No. 7,801,715 by the present applicants.

FIELD OF THE INVENTION

The illustrative embodiment of the present invention relates generally to block diagram execution, and more particularly to the restoration of simulation context information from a previous simulation or execution into a new simulation or execution of a block diagram.

BACKGROUND

Simulation of block diagrams is an important tool in the analysis of engineering systems. Simulation enables the studying of system behavior, the automatic performing of optimizations, and the evaluation of system analysis algorithms, among other uses. In many cases, engineered systems are operated in a pseudo steady state while more dynamic behavior is only present (and even permitted) in transitional stages. For example, after a distinct start-up phase, a cooling system runs at a given operating point. Similarly, aircraft are operated in cruise, a pseudo steady state, for extended periods of time, and transistors are typically biased to operate at a (near) linear part of their performance characteristic.

Various classes of block diagrams describe computations that can be performed on application specific computational hardware, such as a computer, microcontroller, FPGA, and custom hardware. Classes of such block diagrams include time-based block diagrams such as those found within Simulink® from the MathWorks, Inc. of Natick Mass., state-based and flow diagrams such as those found within Stateflow® from the MathWorks, Inc. and data-flow diagrams. A common characteristic among these various forms of block diagrams is that they define semantics on how to execute the diagram.

Historically, engineers and scientists have utilized time-based block diagram models in numerous scientific areas such as Feedback Control Theory and Signal Processing to study, design, debug, and refine dynamic systems. Dynamic systems, which are characterized by the fact that their behaviors change over time, are representative of many real-world systems. Time-based block diagram modeling has become particularly attractive over the last few years with the advent of software packages such as Simulink from The MathWorks, Inc. Such packages provide sophisticated software platforms with a rich suite of support tools that makes the analysis and design of dynamic systems efficient, methodical, and cost-effective.

A dynamic system (either natural or man-made) is a system whose response at any given time is a function of its input stimuli, its current state, and the current time. Such systems range from simple to highly complex systems. Physical dynamic systems include a falling body, the rotation of the earth, bio-mechanical systems (muscles, joints, etc.), bio-chemical systems (gene expression, protein pathways), weather and climate pattern systems, etc. Examples of man-made or engineered dynamic systems include: a bouncing ball, a spring with a mass tied on an end, automobiles, airplanes, control systems in major appliances, communication networks, audio signal processing, nuclear reactors, a stock market, etc. Professionals from diverse areas such as engineering, science, education, and economics build mathematical models of dynamic systems in order to better understand system behavior as it changes with the progression of time. The mathematical models aid in building "better" systems, where "better" may be defined in terms of a variety of performance measures such as quality, time-to-market, cost, speed, size, power consumption, robustness, etc. The mathematical models also aid in analyzing, debugging and repairing existing systems (be it the human body or the anti-lock braking system in a car). The models may also serve an educational purpose of educating others on the basic principles governing physical systems. The models and results are often used as a scientific communication medium between humans. The term "model-based design" is used to refer to the use of block diagram models in the development, analysis, and validation of dynamic systems.

For efficient analyses, it is important to be able to initialize the system at its steady state, the point of normal operating equilibrium. For example, to study behavior of a cooling system when faults such as pipe blockages occur, if the system can be set to its steady state immediately, the lengthy process of simulating the start-up behavior can be eliminated. Given the state vector values in steady state, a manifold of perturbation analyses can be quickly performed. This is critical in many applications. For example, in doing fault detection and isolation, it is assumed the system is operating at its nominal, steady state, operating point. Any deviations from this indicate failure and depending on the particular behavior of the deviation, the specific failure (i.e., which component is faulty) can be identified. To study and analyze the effectiveness of the diagnosis engine, it is required to perform many perturbation studies from the nominal behavior, which is often steady state.

System design and analysis is thus in many cases a process of two distinct stages: one concerns the transitional phase and the other the pseudo steady state phase. The latter of these has its own set of models and methods for design and analysis. Often times, these models include linearized dynamics around the operating point ('small signal models') to facilitate, e.g., perturbation analyses. Note that steady state may also be a periodic behavior with a given frequency.

At present, to study perturbations from a steady state of a system, the system is first simulated till it has reached a point in time where its state variables are stationary. Once steady state is reached, the system state is saved. Studies from steady state can now be executed by first loading the state variable values, without the need to go through the (possibly lengthy) transient behavior. This state can now be restored an arbitrary number of times, e.g., allowing the study of deviations when failures occur.

Unfortunately, this design scenario may fail in some situations where the simulation of a system includes more persistent variables than just the mathematical state. Most prominently, the solver that is used to generate simulation trajectories from differential equations contains a history of integration points, timing information, dynamically changed step size, etc., that needs to be restored in order to generate accurate reproduction of an otherwise uninterrupted simulation. Even if only one persistent variable is not saved and restored, this discrepancy can become arbitrarily large as a small deviation of the initial conditions can lead to grossly different behavior.

The same issues regarding the saving of persistent variables that are present during the simulation of block diagrams are also present during non-simulation execution of block diagrams. For example, graphical data flow programming (i.e., data flow diagrams) enables the visualization of mathematical operations on data. Often, the execution of such visualizations is based on token exchange. Again, executions can be run until a point of interest is reached from which it is possible to continue at a later time or from which several perturbation executions are initiated. This again requires storing all persistent variables in order to avoid discrepancies between an uninterrupted and a continued execution.

BRIEF SUMMARY OF THE INVENTION

The illustrative embodiment of the present invention prevents deviations that may occur when only the mathematical system state is restored from a previous simulation by storing the part of the simulation or execution engine image that is necessary to produce identical continuations from the saved point of a simulation or non-simulation execution of a block diagram. The restored simulation or execution will replicate an earlier simulation/execution up until the saved point. This part of the image is called the context and includes (i) present values of the system such as continuous state variables, discrete states, output values of blocks and (sub)systems, (ii) solver variables such as the timing info, step size, tolerances, Jacobian, algebraic loop variables, (iii) zero-crossing information such as the sign of zero-crossing variables, and (iv) debug information. A subset of this is the dynamic system state. The restored simulation may be used to run alternative scenarios from the saved point such as a system having achieved a steady state without the necessity of executing the simulation up until that point. A restored execution may be used for a number of purposes, such as to generate code from a certain point in the execution of a block diagram without having to re-execute the diagram up until the saved point.

In one embodiment in a block diagram environment, areas of memory that are to be used to simulate a block diagram are registered. Simulation of a block diagram is initiated and the block diagram is executed until reaching an indicated point in the simulation. Upon reaching the indicated point in the simulation, the simulation context variables are saved in a storage location, the simulation context variables including non-mathematical persistent variables used to simulate the block diagram.

In another embodiment in a block diagram environment simulation of a block diagram is initiated and the block diagram is executed until reaching an indicated point in the simulation. Upon reaching the indicated point in the simulation, the simulation context variables are saved in a storage location, the simulation context variables including non-mathematical persistent variables used to simulate the block diagram.

In a different embodiment in a non-simulation block diagram environment, areas of memory that are to be used to execute a block diagram are registered. Execution of a block diagram is initiated and the block diagram is executed until reaching an indicated point in the execution. Upon reaching the indicated point in the execution of the block diagram, the execution context variables are saved in a storage location, the execution context variables including non-mathematical persistent variables used to simulate the block diagram.

In an embodiment in a non-simulation block diagram environment, execution of a block diagram is initiated and the block diagram is executed until reaching an indicated point. Upon reaching the indicated point in the execution, the execution context variables are saved in a storage location, the execution context variables including non-mathematical persistent variables used to simulate the block diagram.

BRIEF DESCRIPTION OF THE DRAWINGS

FIG. 11B depicts the execution timing of block diagrams in single task mode in timelines synchronized and non-synchronized with real world time;

DETAILED DESCRIPTION

Figure 1:
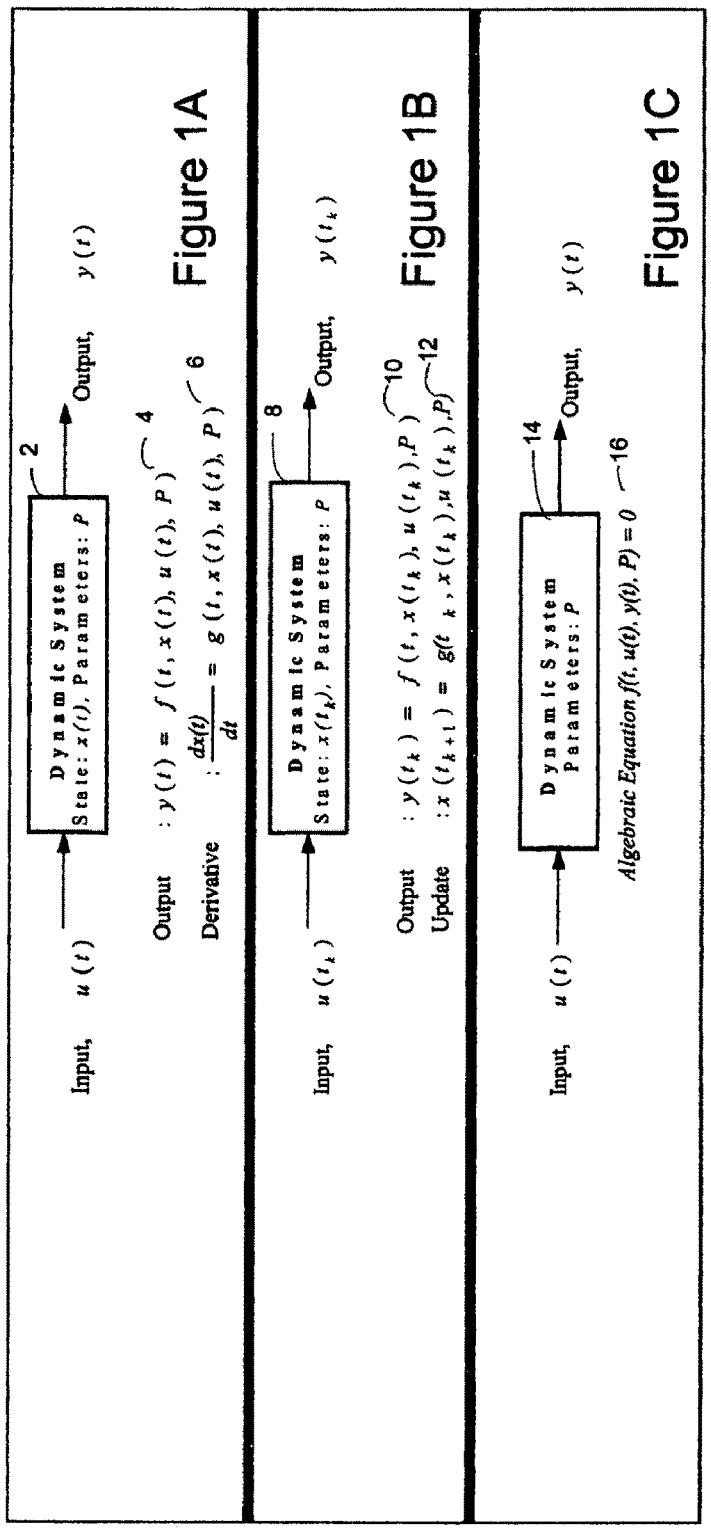
FIG. 1A depicts a dynamic system described with ordinary differential equations (ODE)
FIG. 1B depicts a dynamic system described with difference equations.
FIG. 1C depicts a dynamic system described with algebraic equations.

The illustrative embodiment of the present invention provides a mechanism for saving portions of a simulation or execution engine image at various points in a simulation or execution of a block diagram. The saving of the simulation or execution context in addition to the more traditional saving of the system state information enables the restoration of a simulation or execution that is capable of producing in a subsequent simulation or execution continuing from the point of the saved simulation/execution results identical to those of the initial simulation/execution. The ability to restore more than just system state variables enables a user to run multiple variations of a simulation from a given point without having to replicate the simulation up until the point of the saved initial simulation, and the ability to run multiple iterations of a block diagram execution in a non-simulation execution from a given point without having to replicate the execution of the block diagram up until that point.

Throughout the description contained herein, reference is made to the simulation of a block diagram and to saved simulation context and simulation context variables. It should be understood that the present invention is also applicable to the execution of block diagrams taking place in non-simulation environments. Although for clarity and brevity's sake, the examples and descriptions contained herein focus on the simulation of block diagrams, wherever reference is made in the description to the simulation of a block diagram, the saving of simulation context and/or simulation context variables, the description should be understood to also be applicable to the execution of block diagrams and the saving of execution context and execution context variables in a non-simulation setting.

Conventional simulation packages such as Simulink enable the execution of block diagrams, both time-based and otherwise. The illustrative embodiment of the present invention extends the functionality of these conventional software packages to allow the storing of simulation context as discussed further below. The extension of the functionality provided by the illustrative embodiment of the present invention may best be illustrated by first discussing the functionality of block diagram simulation in general in order to illustrate the improvements provided by the present invention. Although reference and examples are made herein to the Simulink simulation environment, those skilled in the art will recognize that the extension of functionality provided by the present invention is equally applicable to other prior art block diagram systems.

Dynamic systems are typically modeled in simulation environments as sets of differential, difference, and/or algebraic equations. At any given instant of time, these equations may be viewed as relationships between the system's output response ("outputs"), the system's input stimuli ("inputs") at that time, the current state of the system, the system parameters, and time. The state of the system may be thought of as a numerical representation of the dynamically changing configuration of the system. For instance, in a physical system modeling a simple pendulum, the state may be viewed as the current position and velocity of the pendulum. Similarly, a signal-processing system that filters a signal would maintain a set of previous inputs as the state. The system parameters are the numerical representation of the static (unchanging) configuration of the system and may be viewed as constant coefficients in the system's equations. For the pendulum example, a parameter is the length of pendulum and for the filter example; a parameter is the values of the filter taps.

There are four common types of mathematical models used in the study of dynamic systems. The first type of mathematical model describes systems using ordinary differential equations (ODEs) and is depicted in FIG. 1A. The dynamic system 2 specifies a set of two equations: Output 4 and Derivative 6. The Output equation 4 facilitates the computation of the system's output response at a given time instant as a function of its inputs, states, parameters, and time. The Derivative equation 6 is an ordinary differential equation that allows the computation of the derivative of the states at the current time as a function of the inputs, the states, parameters, and time. This class of models is suitable for systems in which it is important to track the system response as a continuous function of time. Such continuous-time systems are commonly representative of physical systems (mechanical, thermal, electrical). For simple systems, it may be possible to use the Output 4 and Derivative equations 6 to obtain a closed-form solution for the output response y(t). But in most complex real world systems, the response of the system is obtained by integrating the states through numerical means.

The definition of an ODE used herein encompasses both implicit and explicit differential equations. The class of ordinary differential equations may require additional equations to define the system being modeled. For example, equations called projections may be required to impose constraints on the differential variables (e.g., states $X_1$ and $X_2$ must fall on the manifold defined by $X_1^2+X_2^2=25$). These constraints can be either applied as a secondary condition or a coupled condition to the differential equation. Although systems including the projections may conventionally no longer qualify as an ODE; they are included here to simplify the categories of systems. Another example is the use of a Jacobian equation that defines partial derivatives with respect to the independent and/or differential variables. The Jacobian equation is typically used when obtaining a linear approximation of a non-linear model or an overall linear model of a set of equations. Jacobian equations are required for some forms of numerical integration, for producing the linear model once the model has reached its steady state operating point, etc. The Output 4 and Derivatives equations 6 may be extended to define other relationships for the block. For example, the Output equation 4 may help manage its states by defining a relationship where it resets the state back to a known quantity at a specific point in time or when a specific condition is seen.

Another type of mathematical model describes systems using difference equations as depicted in FIG. 1B. The dynamic system 8 specifies a set of two equations: Output 10 and Update 12. The Output equation 10 facilitates the computation of the system's output response at a given time instant as a function of the inputs, states at some previous time, parameters, and time. The Update equation 12 is a difference equation that allows the computation of the states at the current time as a function of the inputs, states at some previous time, parameters, and time. This class of models is suitable for systems in which it is important to track the system response at discrete points in time. Such discrete-time systems are commonly representative of discrete-time control and digital signal processing systems. For simple systems, it may be possible to use the Output 10 and Update equations 12 to obtain a closed-form solution for the output response y(t). But in most complex real world systems, the response of the system is solved through recursion. The Output 10 and Update equations 12 are applied repeatedly to solve for the system response over a period of time.

An additional type of mathematical model describes systems using algebraic equations as depicted in FIG. 1C. The dynamic system 14 uses an algebraic equation 16 that needs to be solved at each time to obtain the outputs. While simple systems may allow one to obtain a closed-form solution for the system inputs and outputs, practical algebraic equations may best be solved iteratively using a numerical method involving both perturbations and iterations. Algebraic equation solving techniques used in the context of dynamic system modeling are discussed in greater detail below.

A fourth type of mathematical model is a composite system that has components that fall into the three types of models discussed above. Most complex real-world system models fall into this category. This class of systems has Output, Derivative, Update, and potentially other equations. Solving for the output response of such systems requires a combination of the solution approaches discussed for all of the classes above. One example of a composite system is one described by differential-algebraic equations (DAEs) which contain both differential equations and algebraic equations. Grouped within the composite class of systems are many extensions involving relationships (equations) defined in terms of both outputs and state. For example, one can define a limited integration relationship for a differential variable. This relationship requires a set of equations that includes the Output equation, an Update equation, a Derivative equation, and a Zero Crossing equation. The Zero Crossing equation defines the points in time where the upper and lower limits of the limited integration occur. Another example of an extension is the notion of Enable and Disable equations that define relationships among states or signals when parts of a system are activated and deactivated during execution.

Inherent in the four classes of systems (ODE, difference equations, algebraic equations and composite) is the notion of system sample time. The sample time is the time interval at which the inputs, state, or outputs (collectively referred to as the results) of the system are traced as time progresses. Based on sample times, a system can be described as a discrete-time system, continuous-time system and hybrid system. A discrete-time system is a system in which the evolution of the system results are tracked at finite intervals of time. In the limit as the interval approaches zero, the discrete-time system becomes a continuous-time system. The intervals of time may be periodic or non-periodic. Sometimes, non-periodic rate systems are referred to as non-uniform rate systems meaning that there is no periodic rate at which the response can be tracked. Non-uniform-rate systems can fall into the class of composite systems where an additional equation (GetTimeOfNextVarHit) defines when in the future the other equations associated with the system should be evaluated. A continuous-time system is a system in which the evolutions of the system results are continuously changing. Continuous-time signals change during numerical integration (minor time steps). An example of a continuous-time system is one described by an ODE. There can also be algebraic or composite continuous-time systems. A hybrid system is a system with both discrete-time and continuous-time elements.

If a system has only one sample time, it is said to be single-rate. If a system has multiple sample times, it is said to be multi-rate. Multi-rate systems can be evaluated (executed) using either a single-tasking form of execution or a multi-tasking form of execution. When multi-tasking execution is used, it conforms to rate monotonic scheduling principals as defined by LIU, C. L., and LAYLAND, J. W. *Scheduling Algorithms for Multiprogramming in a Hard-Real-Time Environment*. ACM 20, 1 (January 1973), 46-61. Systems may also be categorized by the type of numerical integration solver being used. A fixed-step system is one that uses a fixed-step solver. Fixed-step solvers typically use explicit methods to compute the next continuous state at fixed periodic intervals of time. A variable-step system is one that is using a variable-step solver. A variable-step solver can use either implicit or explicit methods to compute the next continuous state at non-periodic intervals of time. Generally, variable-step solvers use a form of error control to adjust the interval size such that the desired error tolerances are achieved.

In practice, except for the most basic systems, mathematical models for dynamic systems involve a complex set of mathematical transformations applied in some prescribed manner with the outputs of some transformations forming the inputs of others. Each elemental transformation may be viewed in isolation as a simple dynamic system falling into one of the categories listed above. Therefore, a complex dynamic system may be modeled as an interconnection of various simple dynamic systems. A schematic representation of such an interconnection that has evolved over the years is the block diagram. Such block diagram models have now become a standard means in textbooks, design papers, journal articles, and specifications to communicate the details of a dynamic system's behavior.

Figure 2:
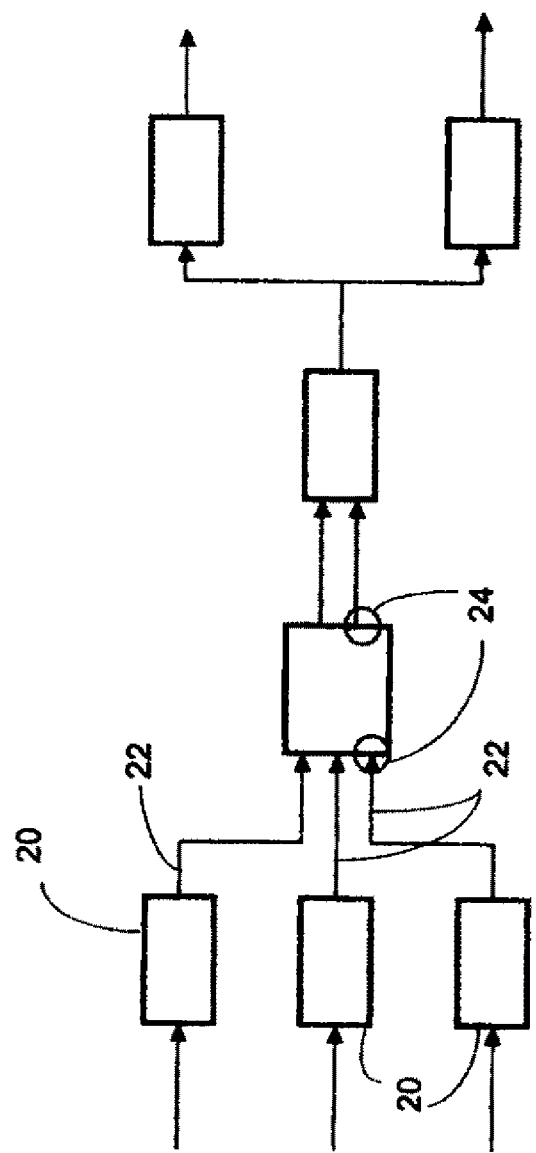
FIG. 2 depicts components of a basic block diagram.

A block diagram model of a dynamic system is represented schematically as a collection of blocks interconnected by lines that represent signals. A signal represents the input and output of a dynamic system. Each block represents an elemental dynamic system. A line emanating at one block and terminating at another signifies that the output of the first block is an input to the second block. Each distinct input or output on a block is referred to as a port. Signals correspond to the time-varying quantities represented by each line connection and are assumed to have values at each time instant. The source block of a signal writes to the signal at a given time instant when its system equations are solved. The destination blocks of this signal read from the signal when their system equations are being solved. The basic components of a block diagram are illustrated in FIG. 2. The block diagram includes a plurality of blocks 20, lines 22 and ports 24 that are interconnected. Those skilled in the art will recognize that the term "blocks" does not refer exclusively to elemental dynamic systems but may also include other modeling elements that aid in readability and modularity of block diagrams.

The theory of Digital Signal Processing (DSP) focuses on modeling signals as sequences of samples. This view naturally fits into the time-based block diagram paradigm by mapping the samples u[n] to discrete-time points $u(t_k)$. This adds the benefit of being able to model the interaction between DSP systems and other classes of time-based systems, e.g. continuous and/or discrete-time control systems.

Put another way, block diagram models are time-based relationships between signals and state variables representative of a dynamic system. The solution (computation of system response) of the model is obtained by evaluating these relationships over time, where time starts at a user-specified "start time" and ends at a user-specified "stop time". Each evaluation of these relationships is referred to as a time step. Signals represent quantities that change over time, and these quantities are defined for all points in time between the block diagram's start and stop time. The relationships between signals and state variables are defined by sets of equations represented by blocks. These equations define a relationship between the input signals, output signals, state, and time. Inherent in the definition is the notion of parameters, which are the coefficients of the equations.

It is important to note that block diagrams are not exclusively used for representing time-based dynamic systems but also for other models of computation. For instance, flowcharts are block diagrams used to capture process flow and are not generally suitable for describing dynamic system behavior. Data flow block diagrams are block diagrams that describe a graphical programming paradigm where the availability of data (often thought of as tokens) is used to initiate the execution of blocks, where a block represents an operation and a line represents execution dependency describing the direction of data flowing between blocks. As used herein, the term block diagrams means time-based block diagrams used in the context of dynamic systems except as otherwise noted.

Block diagram modeling has spawned a variety of software products such as Simulink from the MathWorks, Inc. of Natick, Mass., that cater to various aspects of dynamic system analysis and design. Such products allow users to perform various types of tasks including constructing system models through a user-interface that allows drafting block diagram models, allowing augmentation of a pre-defined set of blocks with custom user-specified blocks, the use of the block diagram model to compute and trace the temporal evolution of the dynamic system's outputs ("executing" the block diagram), and automatically producing either deployable software systems or descriptions of hardware systems that mimic the behavior of either the entire model or portions of it (referred to herein as "code generation"). Each of the tasks listed above has many intricate details and subtle variations that are explored further below.

Block modeling software includes a number of generic components. Although the discussion contained herein focuses on Simulink version 5.0 (Release 13) from the MathWorks, Inc. of, Natick Mass., those skilled in the art will recognize that it is applicable to other block modeling software applications. The generic components include a block diagram editor, blocks and a block diagram execution engine. The block diagram editor allows users to perform such actions as draw, edit, annotate, save, and print out block diagram representations of dynamic systems. As noted earlier, blocks are the fundamental mathematical elements of a classic block diagram model. Simulink extends the classic block diagram models by introducing the notion of two classes of blocks, non-virtual blocks and virtual blocks. Non-virtual blocks are elementary dynamic systems. A virtual block is provided for graphical organizational convenience and plays no role in the definition of the system of equations described by the block diagram model. Examples of virtual blocks are the Bus Creator virtual block and Bus Selector virtual block which are used to reduce block diagram clutter by managing groups of signals as a "bundle". Virtual blocks may be used to improve the readability of models. Simulink further extends the meaning of a non-virtual block to include other semantics, such as a "merge" block semantic. The merge block semantic is such that on a given time step its output is equal to the last block to write to an input of the merge block. An additional extension provided by Simulink is the concept of conditional execution. Simulink contains the concept of conditional and iterative subsystems that control when in time block methods execute for a sub-section of the overall block diagram.

A block diagram execution engine contributes to the modeling software task of enabling the computation and tracing of a dynamic system's outputs from its block diagram model. An execution engine carries out the task of compiling and linking the block diagram to produce an "in-memory executable" version of the model that is used for generating code and/or simulating or linearizing a block diagram model. Note that execution of the block-diagram is also referred to as simulation. The compile stage involves checking the integrity and validity of the block interconnections in the block diagram. In this stage, the engine also sorts the blocks in the block diagram into hierarchical lists that are used when creating the block method execution lists. In the link stage, the execution engine uses the result of the compiled stage to allocate memory needed for the execution of the various components of the block diagram. The linking stage also produces block method execution lists which are used by the simulation or linearization of the block diagram. Included within the link stage is the initialization of the model which includes the evaluating of "setup" methods (e.g. block start, initialize, enable, and constant output methods). The block method execution lists are generated because the simulation and/or linearization of a model must execute block methods by type (not by block) when they have a sample hit.

After linking has been performed, the execution engine may generate code. In this stage, the execution engine may choose to translate the block diagram model (or portions of it) into either software modules or hardware descriptions (broadly termed code). If this stage is performed, then the stages that follow use the generated code during the execution of the block diagram. If this stage is skipped completely, then the execution engine uses an interpretive mode of execution for the block diagram. In some cases, the user may not proceed further with the execution of the block diagram because they would like to deploy the code outside the confines of the block diagram software. Upon reaching the simulation stage, the execution engine uses a simulation loop to execute block methods in a pre-defined ordering upon a sample hit to produce the system responses as they change with time.

For linearization, Simulink uses the block method execution lists in a prescribed fashion to produce a linear state space representation of the dynamic system described by the block diagram.

The block diagram editor is the graphical user interface (GUI) component that allows drafting of block diagram models by a user. In Simulink, there is also a textual interface with a set of commands that allow interaction with the graphical editor. Using this textual interface, users may write special scripts that perform automatic editing operations on the block diagram. A user generally interacts with a set of windows that act as canvases for the model. There is generally more than one window for a model because models may be partitioned into multiple hierarchical levels through the use of subsystems (discussed further below).

A suite of GUI tools in Simulink allows users to draft a block diagram model on the corresponding windows. The GUI tools include a block palette, wiring line connection tool, annotation tool, formatting tool, attribute editing tool, save/ load tool and publishing tool. The block palette is a library of all the pre-defined blocks available to the user when they are building the block diagram. Individual users may be able to customize this palette to: (a) reorganize blocks in some custom format, (b) delete blocks they do not use, and (c) add custom blocks they have designed. The palette allows blocks to be dragged through some human-machine interface (such as a mouse or keyboard) from the palette on to the window (i.e., model canvas). The graphical version of the block that is rendered on the canvas is called the icon for the block. There may be different embodiments for the block palette including a tree-based browser view of all of the blocks.

The wiring line connection tool allows users to draw directed lines that connect the ports of blocks in the model's window. Lines are also added through various mechanisms involving human-machine interfaces such as the mouse or keyboard. Simulink also provides various forms of auto-connection tools that connect blocks automatically on user request to produce an aesthetically pleasing layout of the block diagram (especially those with high complexity with large numbers of blocks). The annotation tool allows users to add notes and annotations to various parts of the palette for a block diagram. The formatting tool enables users to perform various formatting operations that are generally available on any document editing tool. These operations help pick and modify the various graphical attributes of the block diagram (and constituent blocks) such as include font-selection, alignment & justification, color selection, etc. The block diagram and all the blocks within the block diagram generally have a set of functional attributes that are relevant for the execution or code-generation. The attribute editing tool provides GUIs that allows these attributes to be specified and edited. The save/load tool allows a created block diagram model to be saved. The saved model can be reopened in the editor at some later juncture through a load mechanism. Simulink also allows users to save blocks including pre-constructed subsystems into a separate class of block-diagrams called libraries. Such libraries facilitate reuse of the same block in a number of other block diagrams. The load/save mechanism is specially equipped to handle loading and saving of blocks in a block-diagram that actually reside in libraries.

The publishing tool enables the viewing of the block diagram as a document that can be published in any of the standard document formats (examples: PostScript, PDF, HTML, etc.). Those skilled in the art will recognize that the windows for multiple models and all of the tools mentioned above could potentially be embedded in a single Multi-Document Interface (MDI) for providing a unified software environment.

Those skilled in the art will also recognize that block-diagram packages offer scripting languages for writing out programs that automatically carry out a series of operations that would normally require interaction with the GUI. For example, Simulink offers a set of commands in MATLAB for carrying out operations such as block addition (add_block), block deletion (delete_block), starting and terminating execution (set_param), modifying block attributes (set_param/get_param), etc.

Simulink also offers a variety of other GUI tools that improve the ability of users to build and manage large block diagrams. Examples of such GUIs include: (a) a Finder that helps find various objects such as blocks and lines within a block-diagram, (b) a Debugger that helps debug the execution of block-diagrams, (c) a Revision Control UI for managing multiple revisions of the block-diagram, and (d) a Profiler for viewing timing results while executing a block-diagram.

A typical base data-structure for a block may be represented as:

```
class Block {
public:
// Access methods for setting/getting block data
...
// Methods for block editing
virtual ErrorStatus BlockDrawIcon( );
virtual BlockParameterData BlockGetParameterData( );
...
// Methods for block compilation
...
// Methods for block execution
............................................
virtual ErrorStatus BlockOutput( )    = 0;
virtual ErrorStatus BlockDerivative( ) = 0;
virtual ErrorStatus BlockUpdate( )    = 0;
...
private:
BlockGraphicalData blkGraphicalAttributes;
BlockFunctionalData blkFunctionalAttributes;
BlockCompiledData blkCompiledAttributes;
BlockExecutionData blkExecutionData;
...
};
```

Although the example of the data structure above is written in C++, those skilled in the art will recognize that equivalent data structures written in other languages may also be used. The major data fields of the block data structure fall into four categories, a graphical attributes field, a functional attributes field, a compiled attributes field and an execution data field.

The graphical attributes field is responsible for storing information relevant for graphical rendering of the block within its parent block diagram's GUI. Attributes specific to the block icon such as font, color, name, and icon-image are stored in this field. It should be noted that modifying these attributes does not affect the dynamics of the model using this block. The functional attributes field is responsible for specifying block attributes that may potentially affect the dynamics of the model using this block. These attributes are specified for the block as a whole and the input and output ports of the block. Examples of block attributes include block sample times and restrictive flags. Block sample times specify if the block corresponds to an elemental, continuous, discrete, or hybrid dynamic system. If the block is an elemental discrete-time system, then the attribute specifies the spacing between time instants at which the block response should be traced. A restrictive flag disallows the use of blocks in certain modeling contexts. For example, one may impose the restriction that there may only be one instance of given block in a model.

Attributes of block ports specify properties of the data that is either available or produced at that port. Block port attributes include dimensions, datatypes, sample rates, and direct feedthrough. Dimension attributes are individual dimensions of a multi-dimensional matrix that is used as a container for data elements. Datatype attributes are the datatype of each element of data in the data container. A complexity attribute is a flag to specify if each data element is real or complex. A sample rate attribute specifies how when the signal corresponding to an input or output port will be used. The port sample times may sometimes be used to implicitly infer the block's sample time. The direct feedthrough attribute is specified only for input ports and indicates whether or not the Output and/or GetTimeOfNextHit equations of the block are a function of the given input. This attribute helps in determining the sequence in which block methods should be executed while executing the block diagram.

The compiled attributes field of the block data structure holds the attributes of the block and its ports that mirror the functional attributes listed above. This field is filled in during block diagram compilation by utilizing the functional attributes of the block in conjunction with the functional and compiled attributes of the blocks that are connected to it. This process of determining the compiled attributes from the functional attributes is termed attribute propagation. Attribute propagation is described in greater detail below in the section on block diagram compilation. The execution data field is mainly responsible for storing the memory locations that are going to serve as sources for block inputs, outputs, states, parameters, and other work areas during execution of blocks.

The block data structure also has a set of associated methods that may be categorized as access methods to data fields, methods used in editing, methods used in compilation and methods used in execution. Access methods to data fields help in setting and getting the various data fields of the block. Methods used in editing are called by the block diagram editor in order to render the block appropriately in the GUI of its parent block diagram. For instance, this set of methods may include a BlockDrawIcon method that determines the shape the block icon has on the GUI. Methods used in compilation are methods that are called by the block diagram compilation engine. They help validate the connections of the block to other blocks on the block diagram. The methods used in execution include a number of different run-time methods that are required for execution. These include the BlockOutput, BlockUpdate, BlockDerivative methods that realize the Output, Update, and Derivative equations discussed earlier in the context of dynamic systems. In addition to these methods, Simulink includes several other run-time methods, such as the Jacobian, Projection, ZeroCrossings, Enable, Disable, Initialize, EvalParams (check and process parameters), and GetTimeOfNextHit methods. It should be noted that there is no explicit method for algebraic equations because these are represented and processed in a different manner which will be discussed below.

Figure 3:
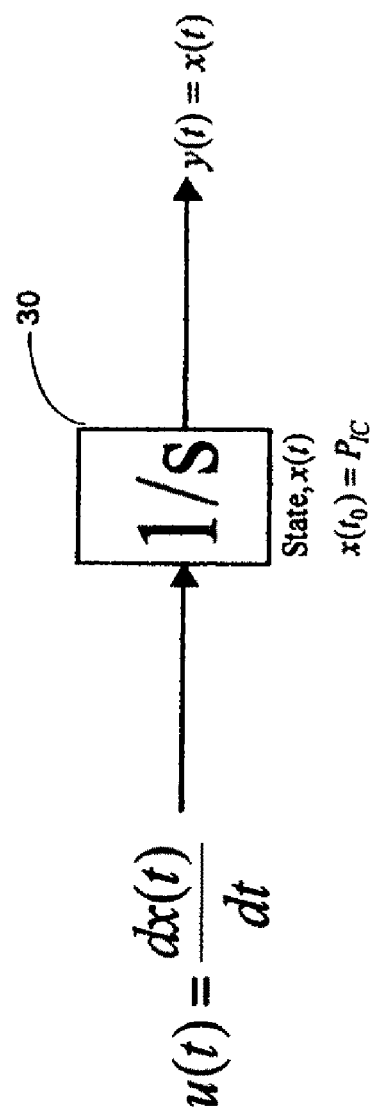
FIG. 3 depicts the desired behavior of an integrator block.

The base data structure for the block specifies the generic fields and interfaces that need to be supported by a block. Some of the methods are purely virtual and have no specific implementation in the base block class. In order to define a specific block (such as an Integrator block), one needs to subclass the base block class and provide explicit definitions for these virtual methods. An example of the subclassing of a block may be seen by examining an Integrator block. FIG. 3 depicts the desired behavior of an Integrator block 30. In order to create the subclass, four major categories of information within the subclass must be specified, the block parameters, the methods used in editing, the methods used in compilation, and the methods used in execution. The elemental dynamic system embodied by the block may be parameterized as illustrated in FIGS. 1A-1C. Each block needs to be able to specify its list of expected parameters. The block diagram editor's Attribute-Editing tool may allow users to specify the parameters for the block when they use it in their models. In the Integrator block example, the block has one parameter that specifies the block's initial condition for the block's state. Regarding the methods used in editing, the subclass needs to specify a method that renders its icon. For example, the Integrator block may implement a method that makes its icon be a box with a '1/s' within the box. Also, the subclass needs to instantiate a method that allows access of the block parameters from the GUI's Attribute-Editing tool. For the Integrator example, this method would allow users to specify the Initial Condition parameter on a GUI for the block. For the methods used in compilation, the subclass needs to instantiate methods that help in the compilation of the block diagram model in which it is placed. These methods help specify the compiled information for the inputs and outputs of the block. For instance, the Integrator block may specify a method that ensures that if the input to the Integrator is a vector, then the output is a vector of the same size. For methods used in execution, the subclass needs to instantiate specific Output, Derivative, and Update methods that represent the block behavior. In the case of the Integrator block, an Output and Derivative method are needed. It should be noted that in Simulink the Integrator block has additional methods that are not illustrated here. The Output method sets the output to be equal to the state. The Derivative method sets the derivative of the state to be equal to the input.

The specification of these four types of information for the Integrator block subclass may be shown by a reduced form of the Simulink Integrator block:

```
IntegratorBlock : public Block {
    public:
        ErrorStatus BlockDrawIcon( ) {
            // Draw '1/s' on the icon
            ..............................
        }
        BlockParameterData BlockGetParameterData( ) {
            // Return initial_condition as block data
            ..............................
        }
        ErrorStatus BlockOutput( ){
            // Implement y(t) = x(t)
            ..............................
        }
        ErrorStatus BlockDerivative( ){
            // Implement dx(t)/dt = u(t)
            ..............................
        }
    private:
        double initial_condition;
};
```

It should be noted that block diagram software generally provides open access to the block's data structure to users of the software. This allows users to create and utilize custom block implementations in their models.

Blocks in a block diagram may be virtual or non-virtual. The designation of a block as non-virtual indicates that it influences the equations in the mathematical model for the dynamic system. In the context of block diagram software, it is beneficial to include other virtual blocks that do not affect the equations in the dynamic system's model. Such blocks help improve the readability and modularity of the block diagram and wield no semantic influence on the mathematical model. Examples of such virtual blocks include virtual subsystems, inport blocks and outport blocks, bus creator blocks and From and Goto blocks.

Modularity may be achieved in a block diagram by layering the block diagram through the use of subsystems. A subsystem facilitates layering by allowing a collection of blocks to be represented by a single block with input and output signals. The input and output signals of the subsystem are accessible to the constituent blocks within the subsystem. A subsystem is a virtual subsystem if its constituent blocks are moved back into the main block diagram model during the model's execution. Within a virtual subsystem graphical entities, called inport and outport blocks, are provided to define signal connections to the parent block diagram. These inport and outport blocks indicate a tunnel-through signal connection to the parent block diagram.

Additional types of virtual blocks include bus creator blocks and selector blocks. In large models, there may be an extensive set of lines that connect one section of a block diagram to another section. To avoid excessive clutter of lines and improve readability, there is typically a special block called a Bus Creator that helps bundle all of the lines together to form a single bus line. This single bus line then connects the two sections of the model. At the destination end of the line, a block called a Bus Selector helps un-bundle the individual lines so that they can be connected to other blocks.

Other virtual blocks include From blocks and Goto blocks that are special blocks that help avoid graphical clutter, e.g. a line that connects two distant sections of a block diagram. The line is terminated close to its originating point by a From block. At the other end, a new line is drawn from a From block that is hot-linked to the Goto block. Each Goto and From block has an associated tag that describes which blocks are connected together. An important point to be noted is that virtual blocks have neither execution data nor execution methods in their data structure.

Simulink also provides the user with the ability to extend the simulator by providing the ability to enhance the simulator with blocks that define dynamic systems or are virtual properties. The extension is provided through a language independent API (e.g. C, C++, Ada, Fortran, Assembly, M).

As noted previously, to facilitate modeling fairly large and complex dynamic systems, Simulink allows users to layer their block diagrams. A subsystem facilitates such layering by allowing a collection of blocks to be represented by a single block with input and output signals. The input and output signals of the subsystem are accessible to its constituent blocks. By nesting subsystems within each other, one can create block diagrams with arbitrary layers of hierarchy. Ideally a subsystem has no impact on the meaning of the block diagram. Additionally, subsystems provide a way of grouping blocks together and allowing other block diagram constructs to impose unified control on the constituent blocks. To enhance the modularity of subsystems, modeling software also allows aggregated list(s) of parameters of the blocks within the subsystem to be accessed from a single GUI, and defines and displays special icons on the subsystems. The process of defining the parameter list and the special icon is called masking a subsystem.

There are two main types of subsystem blocks, virtual subsystems and non-virtual subsystems. Virtual subsystems serve the purpose of providing the block diagram with a graphical hierarchy. Non-virtual subsystems behave like an elemental dynamic system with its own execution methods (Output, Update, Derivatives, etc.). These execution methods in turn call the execution methods of the constituent blocks.

The classes of non-virtual subsystems are:

Atomic subsystems. These are similar to virtual subsystems, with the advantage of grouping functional aspects of models at a given layer. This is useful in modular design.

Conditionally-executed subsystems. These are non-virtual subsystems that execute only when a precondition is fulfilled:

Enabled subsystems. These are similar to Atomic subsystems, except that the constituent blocks only execute when an enable signal feeding the subsystem is greater than zero.

Triggered subsystems. These are similar to Atomic subsystems, except that the constituent blocks only execute when a rising and/or falling signal is seen on a triggering signal feeding the subsystem.

Enable with Trigger subsystems. These are an intersection of the properties of Enabled and Triggered subsystems.

Action subsystems. These subsystems are connected to action-initiator (e.g., an "If" or "SwitchCase" block), a block that explicitly commands the subsystem contents to execute. These subsystems are similar to Enabled subsystems except that the management of the "enabling" signal has been delegated to an action-initiator. Action subsystems define a new type of signal, called an action signal that signifies which subsystems are commanded to execute by the action-initiator.

Function-call subsystems. These subsystems provide a means of collecting blocks into a subsystem that is only executed when called by an owner block. The owner block may compute input signals for the subsystem before calling the subsystem. Additionally, the owner may also read output signals from the subsystem after calling it. Function-call subsystems define a new type of execution control signal, called a function-call signal that contains no data. It is used to define the execution relationship between the owner block and the function-call subsystem. Function-call owners may also designate themselves as an "interrupt" source. In simulation, they simulate the effects of an interrupt and in code generation they can attach themselves to an (asynchronous) interrupt.

While subsystems and For subsystems. These subsystems execute the constituent blocks multiple times on a given time step.

Simulink allows for several forms of block parameters to be defined. There are two general categories of parameters: those parameters that can be modified during simulation and those that cannot be modified. An example of a parameter that may be modified during simulation is the amplitude of a Sine Wave block if configured by the user to allow modification during execution. A parameter such as the amplitude specifies coefficients of the dynamic equation, in this case the amplitude of the sine wave function defined by the Sine Wave block. An example of a parameter that can never be modified during simulation is the sample time of the Sine Wave block. The parameters that can be modified during simulation are further broken down into other categories which include mapping the dialog parameter (e.g. the amplitude) to run-time parameters or converting the dialog parameter to an inlined (non-modifiable) parameter. Run-time parameters can further be mapped to mathematical expressions of tunable Matlab variables or Matlab parameter objects describing properties of the variables (called Simulink.Parameter's). A global run-time parameter data structure is used within Simulink to manage the block parameters during the execution of the model.

In addition to block parameters, there are model-wide parameters which are generally associated with the solver. These parameters include aspects such as the time span in which to perform a simulation, the type of solver, and the time span. Simulink gives the user the ability to adjust solver parameters during model execution. The adjustment of these solver parameters is performed at the start of a time step.

Figure 4:
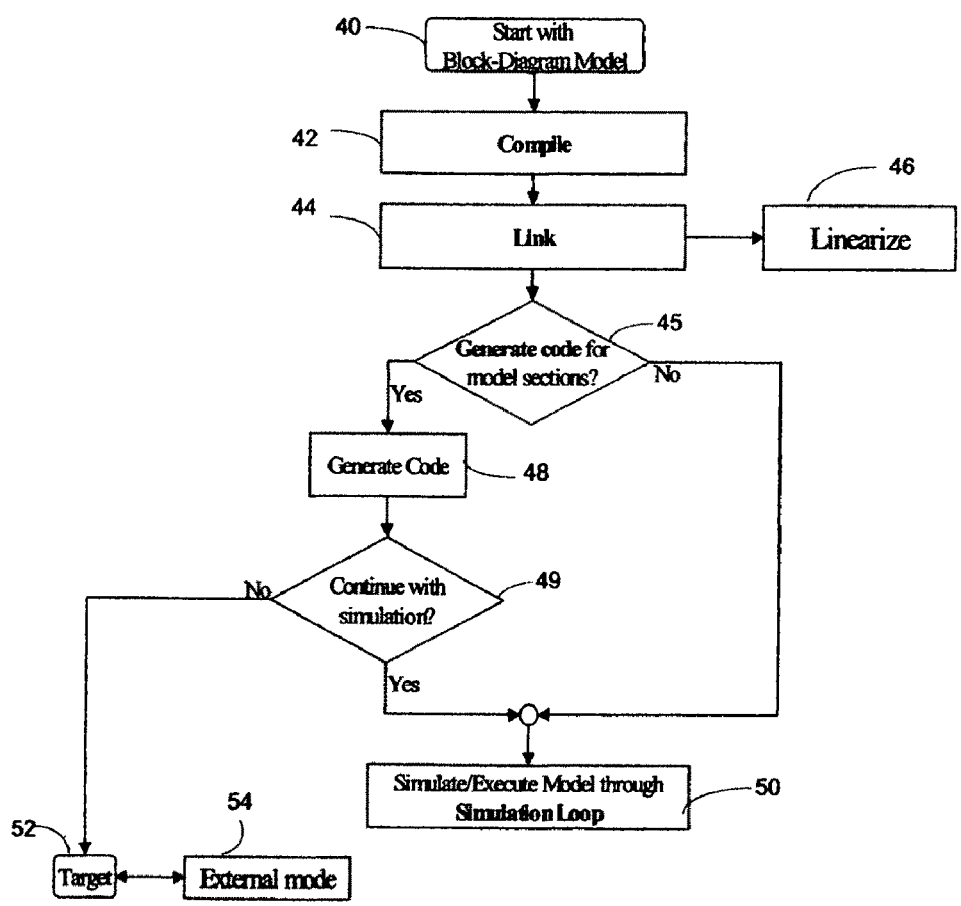
FIG. 4 is a flow chart of the sequence of steps used to perform simulation of the block diagram.

Once a block diagram model has been constructed using the editor, an execution engine allows the model to be solved in order to trace the system outputs as a function of time. The solution of the model, which may be referred to as model execution, is carried out over a user-specified time span for a set of user-specified inputs. Simulation proceeds in four major stages: compilation, link, code generation, and the simulation loop. Alternatively, the execution engine can obtain a linear representation of the model (linearization). The interrelationship between the various stages is illustrated in a flowchart in FIG. 4.

The execution begins when the block diagram 40 is compiled 42. Following the compilation stage, is the model link stage 44 which may also produce linear models 46. Code may or may not be generated 45. If code is generated 48, a decision is made 49 whether to continue the simulation. If the decision is made to continue the simulation the model is simulated/executed through the Simulation Loop 50. If the simulation is not continued, the code may be delivered to a target 52 and executed in an external mode 54. If code is not generated the block diagram may execute in interpretive mode when entering the Simulation Loop 50.

The compile stage marks the start of model execution and involves preparing data structures and evaluating parameters, configuring and propagating block characteristics, determining block connectivity, and performing block reduction and block insertion. The preparation of data structures and the evaluation of parameters creates and initializes basic datastructures needed in the compile stage. For each of the blocks, a method forces the block to evaluate all of its parameters. This method is called for all blocks in the block diagram. If there are any unresolved parameters, execution errors are thrown at this point.

During the configuration and propagation of block and port/signal characteristics, the compiled attributes (such as dimensions, datatypes, complexity, or sample time) of each block (and/or ports) are setup on the basis of the corresponding functional attributes and the attributes of blocks (and/or ports) that are connected to the given block through lines. The attribute setup is performed through a process during which block functional attributes "ripple through" the block diagram from one block to the next following signal connectivity. This process (referred to herein as "propagation"), serves two purposes. In the case of a block that has explicitly specified its block (or its ports') functional attributes, propagation helps ensure that the attributes of this block are compatible with the attributes of the blocks connected to it. If not, an error is issued. For instance, if an Integrator block is implemented to only accept numbers of double precision datatype, then this block will error out if it is driven by a block that produces single precision data, unless the user has asked for an implicit data conversion. Secondly, in many cases blocks are implemented to be compatible with a wide range of attributes. Such blocks adapt their behavior in accordance with the attributes of the blocks connected to them. This is akin to the concept of polymorphism in object-oriented programming languages. For instance, a discrete-time Filter block could be implemented to accept any of the standard integer datatypes ranging from 8-bit to 128-bit. The exact implementation of the block is chosen on the basis of the specific block diagram in which this block finds itself. Included within this step are other aspects such as validating that all rate-transitions within the model yield deterministic results and that the appropriate rate transition blocks are being used.

The compilation step also determines actual block connectivity. Virtual blocks play no semantic role in the execution of a block diagram. In this step, the virtual blocks in the block diagram are optimized away (removed) and the remaining non-virtual blocks are reconnected to each other appropriately. This compiled version of the block diagram with actual block connections is used from this point forward in the execution process Once actual block connectivity has been determined (by removing the virtual blocks) the block diagram may be further optimized by performing block reduction and insertion. During this step, non-virtual blocks may be inserted or a set of non-virtual blocks may be completely removed or reduced to a single equivalent block. Block insertion and reduction is mainly done to improve execution efficiency. Examples of block insertion and reduction include the removal of Gain blocks whose gain value is 1.

Figure 5:
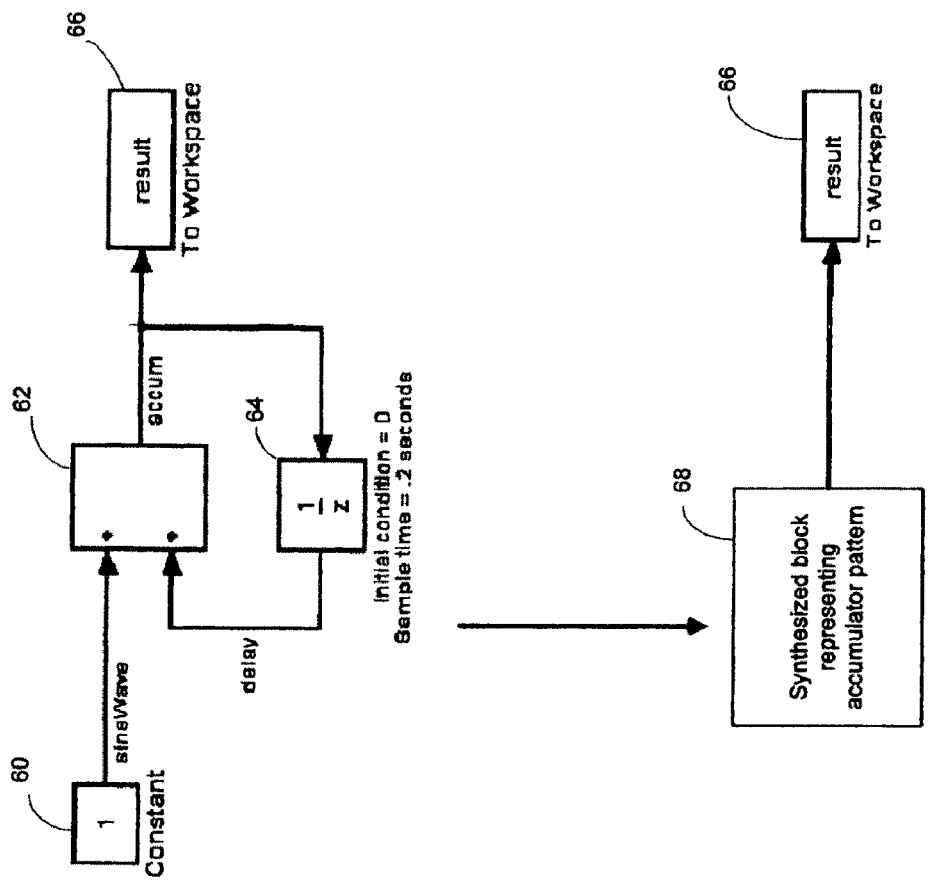
FIG. 5 depicts the replacement of a collection of blocks in a block diagram with an accumulator block.

A Gain block is a block that multiplies its input value by a gain parameter, such as a simple amplifier. FIG. 5 depicts the replacement of a collection of blocks 60, 62, and 64 connected in a accumulator pattern and leading to result 66 with an equivalent synthesized block 68 representing the accumulator pattern leading to the same result 66. A signal copy block may also be automatically inserted in order to make contiguous memory copies of signals that are made up of disjoint memory sections. Block insertion and reduction may also be performed at other suitable stages of compilation.

The way in which blocks are interconnected in the block diagram does not necessarily define the order in which the equations (methods) corresponding to the individual blocks will be solved (executed). The actual order is partially determined during the sorting step in compilation. Once the compilation step has completed, the sorted order cannot be changed for the entire duration of the block diagram's execution.

The first step in sorting involves transforming the graphical block diagram into a compiled (in-memory) directed graph consisting of arcs and vertices. The vertices are derived from some of the non-virtual blocks. For instance, virtual and reduced blocks do not appear in the directed graph. The arcs represent data dependencies between the vertices. The data dependencies do not correspond to the signals in the block diagram. For example, all signals that connect to input ports without direct feed through are "cut" or ignored. In addition, data dependencies are added to capture implicit dependencies. For example, all inputs to a Function-Call subsystem are implicit data dependencies to the owner (caller) block.

Figure 6A:
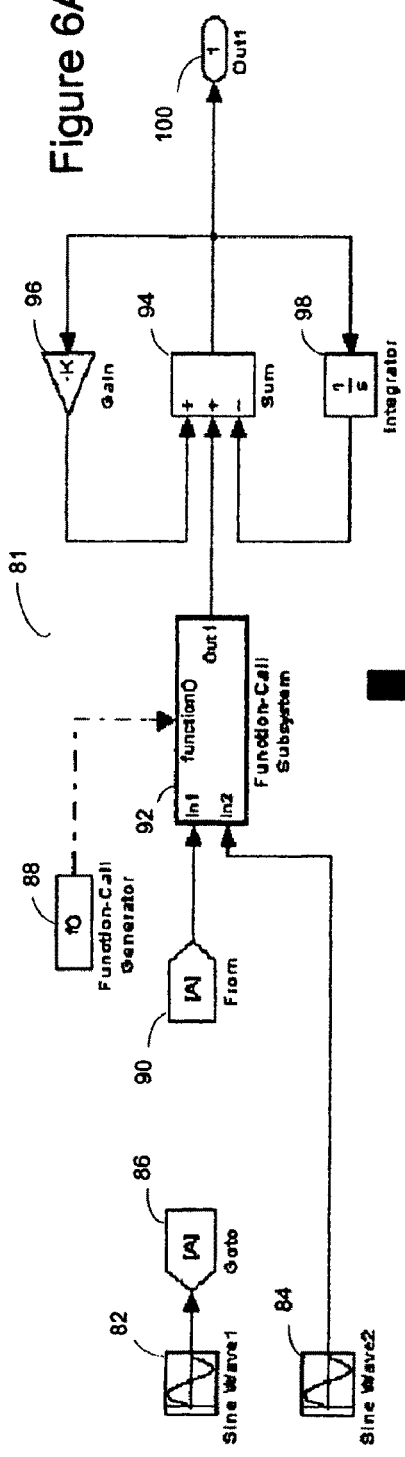
FIG. 6A depicts a block diagram and its associated directed graph.

The process of converting a block diagram into a compiled directed graph is shown in FIG. 6A. A block diagram 81 includes a Sine Wave 1 block 82, a Sine Wave 2 block 84, a Goto block 86, a Function Call Generator block 88, and a From block 90. Also included are a Function Call Subsystem block 92, a Sum block 94, a Gain block 96, an Integrator block 98 and an Outport (Output 1) block 100. Those blocks that are not virtual or reduced appear on the corresponding directed graph 111. The directed graph 111 includes a Sine Wave1 vertice 112, a Sine Wave 2 vertice 114, a function-call generator vertice 116, and a function call subsystem vertice 118. Also included are a Sum vertice 120, a Gain vertice 122, an Integrator vertice 124 and an Outport 1 vertice 126. The vertices are connected by arcs.

Figure 6B:
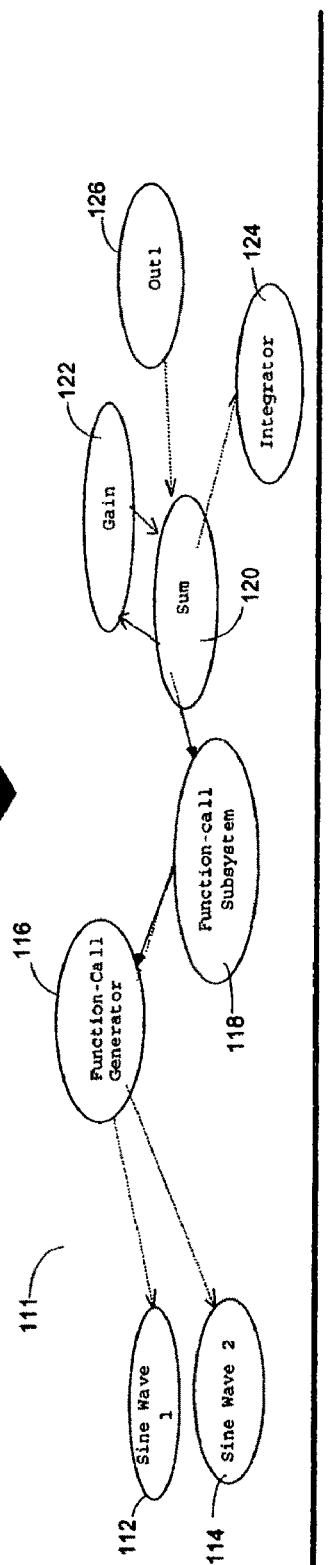
FIG. 6B depicts a linear sorted list generated from the directed graph of FIG. 6A.

The graph is used to sort the blocks into a linear sorted list. FIG. 6B depicts a sorted list 128 generated from the compiled directed graph 111 which includes the elements appearing as vertices in the directed graph 111 sorted into order. The root block diagram has a sorted-list associated with it. Roughly speaking, each non-virtual subsystem layer and some special block diagram elements also each have their own sorted-list. During the sorting of the graph into the list, strongly connected components are identified. The term strongly connected section, which is a term that originates from graph theory, is a subset, S, of the blocks of a block diagram such that any block in S is reachable from any other block in S by following signal connections and S is not a subset of any larger such set. Strongly connected sections are flagged as algebraic loops when all blocks have direct feedthrough (an example is shown in FIG. 6A consisting of the Sum 120 and Gain 122 blocks). Such loops correspond to a set of algebraic equations and are solved using iterations and perturbations during block diagram execution by solving for the algebraic variables. Algebraic variables are either specified by the user via Initial Condition blocks or chosen by the execution engine. Solving of algebraic loops is discussed further below.

Sorting must also take into consideration other user specified dependencies between the blocks. These dependencies include the concepts of priorities and placement groups. A block priority specifies the order in which the equations associated with a block are evaluated with respect to other blocks. Placement groups are a way of causing each class of block methods for a specified set of blocks to be "placed together" in the block method execution lists. The terms "data dependency" or "data precedence" as used herein refers to the arcs of the compiled directed graph and not the signals found within a block diagram. Attempting to correlate data dependencies directly to the signals found within a block diagram is incorrect and leads to the conclusion that Simulink does not satisfy data dependencies, i.e., the execution of the operations or block methods does not satisfy data dependencies if one interprets signal connectivity as specifying data dependencies.

After compilation, the link stage commences. During this stage physical memory allocations are made in order to prepare for execution. Buffers are allocated for block input and output data buffers, states, and work areas. Additionally, block method execution lists that are derived from the sorted list allow for execution of the block diagram. Each block method execution list is a list of block methods that are to be executed in a sequence when each method within the list has a sample hit. There is generally a set of block method execution lists associated with each layer of the block diagram that corresponds to a non-virtual subsystem. Non-virtual subsystems are either defined by the user or automatically synthesized during compilation to either efficiently execute the model or simplify the implementation of the semantics defined by Simulink. In multi-tasking mode, the lists within each layer may be further partitioned when block diagrams have blocks with different sample rates. These lists are explained in greater detail below.

Those skilled in the art will recognize that while the block method execution lists are derived from the sorted list, they do not necessarily correspond one-to-one with the sorted lists. First, each block method execution lists contains only blocks that have such a block method of the given type (class) defined by the list. Second, block methods corresponding to components like the function-call subsystem do not appear on the block method execution lists because they are executed by an "owner" block.

Although included in the discussion of the compilation stage, it is not required that the time-based diagram perform the block sorting step during compilation. The sorting step is performed to achieve efficient execution. Ignoring efficiency, there is no semantic reason to perform the sorting step. Any random ordering of the block methods will work. In fact, any ordering of all block method execution lists except the Output block method execution list will result in the same level of efficiency. Randomly re-ordering the Output block method execution list will yield correct answers. If the Output block method list is randomly ordered, then the Simulation engine, when executing the Output block method execution list, continues sequencing through the Output block method execution list at each point in time until there are no changes.

Similarly included within the linking stage for the sake of simplicity, is the memory initialization of the model. The memory initialization of the model includes invoking block start, initialize, constant initialize, enable, and constant output methods. These are examples of some of the block methods that are used during model setup (prior to execution) to initialize the "state" of the system so that execution or linearization can commence.

The compiled and linked version of the block diagram may be directly utilized to execute the model over the desired time-span. This interpretive mode of execution is suitable for getting fine-grained signal traceability. It should be noted that the traceability associated with interpretive execution comes at the price of increased overhead in the form of additional execution-related data-structures and messaging in the engine. An alternative to the interpretive execution mode is to utilize the generated-code created by Real-Time Workshop tool for Simulink models. In this mode, the engine (upon the behest of the user) translates a selected portion of the block diagram (or the entire block diagram itself) into code. Such code could be in a number of possible forms. The code may be instructions in a high-level software language such as C, C++, Ada, etc., hardware descriptions of the block diagram portions in a language such as HDL, or custom code formats suitable for interpretation in some third-party software. Alternatively, the code may be instructions suitable for a hardware platform such as a microprocessor, microcontroller, or digital signal processor, etc., a platform independent assembly that can be re-targeted to other environments, or just-in-time code (instructions) that corresponds to sections of the block diagram for accelerated performance.

The execution of a portion of the block diagram represented in code may be performed in a number of different ways based on the specific code format. The portion of the block diagram may execute a compiled version of the code generated in a high-level language (accelerated or software-in-the-loop simulation), the execution may simulate code that corresponds to a hardware description on a hardware simulator, (co-simulation execution), the execution may involve calling out to third-party software to run code generated for such software (co-simulation execution), or the execution may call out directly to hardware that will run code that was generated and compiled for that hardware (processor-in-the-loop execution).

There are several different advantages to execution through code generation:

Execution of generated code can be more efficient than interpretive execution because of fewer data-structures and lesser internal messaging in the engine, although the increased efficiency generally comes at the cost of decreased execution traceability. Simulation of hardware descriptions during execution can help identify and resolve bugs in the software stage of a design project. Such bugs prove much more expensive to track and fix once the system has been implemented in hardware. Additionally, block diagram modeling software can be integrated with other software environments that are suitable for modeling and simulating special classes of systems. Models can be tested directly in hardware thereby making prototyping of new systems fast and cost-effective. For instance, consider the design of a controller for an anti-lock braking system of a car. The dynamics of the braking system can be executed in the interpretive mode in the block diagram. The controller itself can be implemented on a hardware micro-controller to test the efficiency of the control laws implemented within. Note that for such target execution, it is normally necessary for the time span over which a model is executed by the software to match real-world time. In other words, the software must allow real-time execution of the block diagram model. Those skilled in the art will recognize that when users generate code, they may choose to not proceed further with the block diagram's execution. They may choose to take the code and deploy it outside of the confines of the modeling software environment. This is normally the last step in the design of dynamic systems in a block diagram software package.

There are several forms of target code execution known to those skilled in the art such as Rapid Prototyping, Embedded System Deployment, and Hardware-in-the-Loop which execute a model or portions of a model via the generated code on a Real-Time System target. One aspect of deploying (executing) the generated code on a target is the notion of "external mode." External mode refers to a system where Simulink acts as a monitor and debugger of the generated code running in real-time on a target. In External Mode, users can change parameters and view signals via standard Simulink elements. Another important aspect of the code generation technology is that it is very extensible. Provided with the Simulink product family is the Target Language Compiler (TLC). This technology enables the creation of "active scripts" that control how the generated code is produced for a block diagram. Using TLC, one can tailor the generated code to suit their specific needs.

The execution of the block diagram uses a Simulation Loop (SimLoop) for solving for the block diagram's outputs for a specified set of inputs over a specified span of time ("Time" in reference to the Simulation Loop means the time-line corresponding to the tracing of the dynamic system's outputs, not real-world time unless otherwise noted). The term "SimLoop" applies to real-time systems where each iteration is tied to a physical periodic clock or other timer source. During this process, the block methods (equations) corresponding to the individual blocks are executed by type following their sorted order when they have a sample hit. The term "block execution" is loosely used to mean executing all block methods associated with the given block for a given time step, generally starting with the output method. Strictly speaking, blocks do not execute; the engine executes (evaluates) the appropriate block methods at the appropriate time points.

SimLoop has two variants "single-tasking" and "multi-tasking" depending on sample times. In general, the sample time of a block is the interval of time between calls to the Output, Update, and/or Derivative methods for a given block. In computing this interval, repeated calls at the same time instant (not in real-world time but the time corresponding to the execution of the dynamic system) are counted as the same call. A block's sample rate may also be thought of as the interval between successive executions of the block methods. If there is no uniform or regular interval between calls, then the block is said have a continuous sample time. If a uniform time interval can be found, then the block is said to have a discrete sample time equal to that interval. Although blocks may be associated with more than one sample time in a sufficiently complex dynamic system the descriptions contained herein are confined to blocks with a single sample-time. Those skilled in the art will recognize that the descriptions may be extended to encompass blocks with multiple sample times.

Figure 7A:
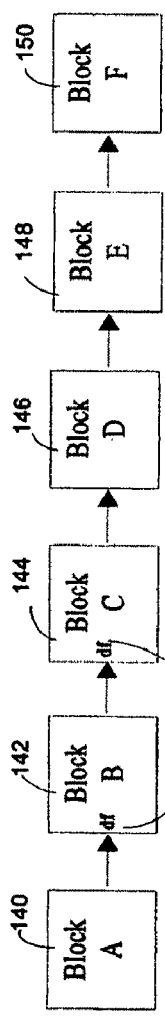
FIG. 7A depicts an abstract example of a block diagram being executed.
Figure 7B:
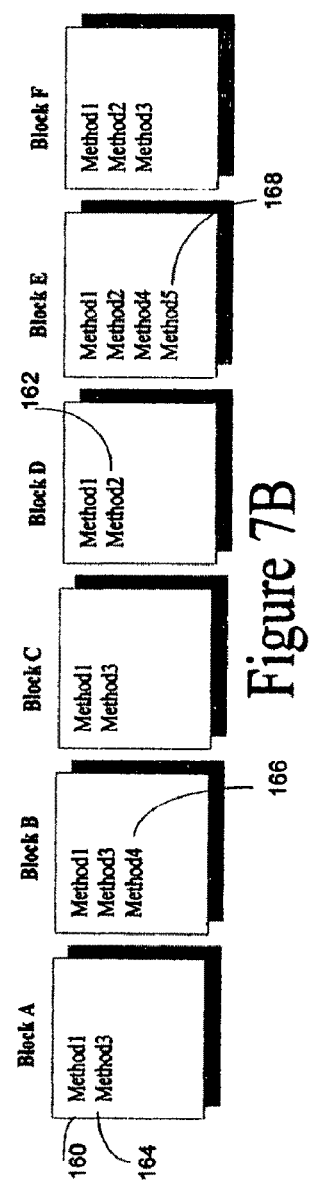
FIG. 7B depicts an abstract view of the execution methods instantiated by the blocks depicted in FIG. 7A.
Figure 7C:
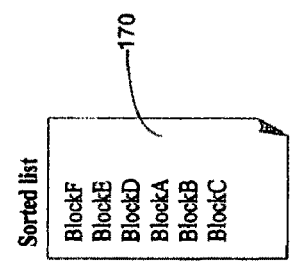
FIG. 7C depicts a sorted list generated from the data dependencies between blocks of FIG. 7A.

FIG. 7A depicts an abstract example of a block diagram being executed. The diagram includes a plurality of blocks 140, 142, 144, 146, 148 and 150. The block ports that have direct feedthrough are explicitly marked (using the symbol 'df') 152. Additionally, an abstract view of the execution methods instantiated by each block is shown in FIG. 7B. The blocks contain a number of different methods 160, 162, 164, 166 and 168. Execution methods includes the three basic execution methods discussed earlier: Output, Update, Derivative, as well as several other methods that aid in advanced block functions such as initialization, linearization and zero-crossing detection. (which are discussed below). The data-dependencies between the compiled vertices created during sorting are used to generate the Sorted List 170 shown in FIG. 7C.

Figure 8:
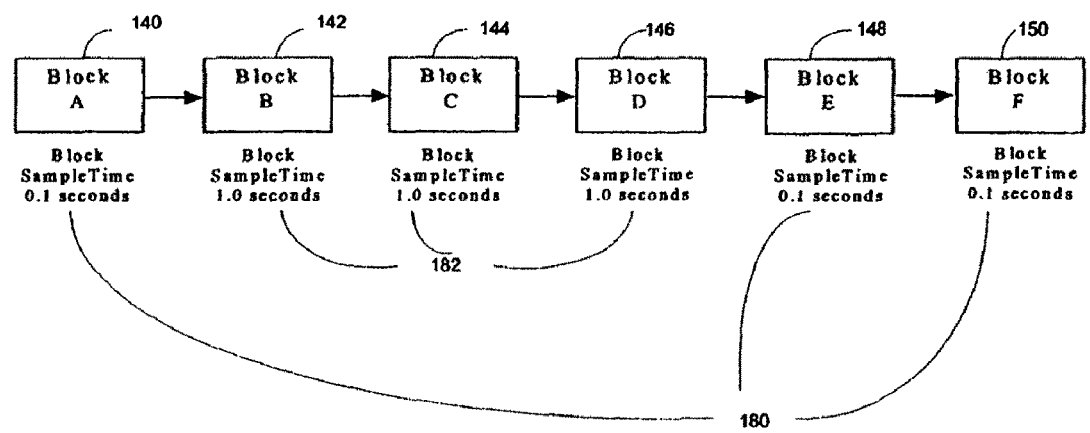
FIG. 8 depicts a multi-rate system.

A block diagram consisting of blocks that all have the same sample time is said to correspond to a single-rate system. A block diagram consisting of blocks that have more than one sample time corresponds to a multi-rate system. FIG. 8 depicts a multi-rate system, adding sample-time information to the block diagram of FIG. 7A. The plurality of blocks 140, 142, 144, 146, 148, and 150 each have an associated sample time. Since the sample times in the block diagram differ between blocks, the system is considered a multi-rate system. Block A 140, block E 148 and block F 150 (collectively 180) each have a sample time of 0.1 seconds. Block B 142, block C 144 and block D 146 (collectively 182) each have a sample time of 1.0 seconds.

The SimLoop is the heart of the execution engine. Each full pass through the loop is responsible for computing the outputs of the system at a particular time. At the end of each loop, the execution time corresponding to the next pass through the loop is computed. If this time exceeds the stop time specified by the user, the execution terminates. Within the loop, the sequence in which individual block equations are solved is determined by two pieces of information: the sample times of the blocks and the sorted order determined during the Compile stage. The amalgamation of these two pieces of information gives the execution lists for the block diagram. Those skilled in the art will recognize that the execution lists are created in the Link stage and are explained in the context of SimLoops for convenience. There are two distinct approaches for building execution lists and using them in the SimLoop. These approaches correspond to the Single-tasking and Multi-tasking SimLoops summarized in the discussion on FIG. 10 below.

Simulink also has the ability to modify coefficients (parameters) of blocks that declare their parameters as tunable. An example of such a block is a Sine Wave block that implements the function: output(time)=amplitude*sin(frequency*time+phase)+bias, where time is the independent variable and the parameters are: amplitude, frequency, phase, bias. When these parameters are declared as tunable, Simulink lets the user change these coefficients during simulation. Changing parameters is a drastic operation in that the definition of the model has changed (e.g. the sine block defines equations that describe the system). Thus, to enable the changing of parameters during the SimLoop, Simulink first queues parameter changes and then applies them on the next time step. Thus, the changing of parameters is not immediate. The delay in the changing of parameters is needed to ensure system stability. The application of the parameters at the start of the next time step is combined with the reset of the solver (Integrator) if needed.

Figure 9:
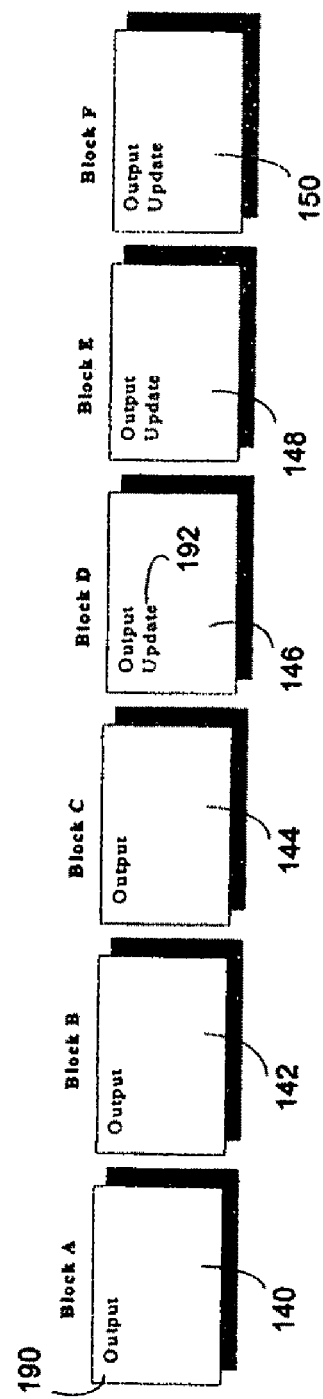
FIG. 9 depicts the block diagram of FIG. 7A and FIG. 8 with associated methods added to the blocks.

For the purpose of exploring single-task loops and multi-task loops, FIG. 9 depicts the block diagrams of FIG. 7A and FIG. 8 where Method1 corresponds to the Output method 190 and Method2 corresponds to the Update method 192. All other methods are ignored in the explanation of the loops. Simpler loops which do not include blocks that have continuous sample times are used in the example since the explanation is simpler in the context of discrete sample times and it is straight-forward to extend to continuous sample times.

Figure 10:
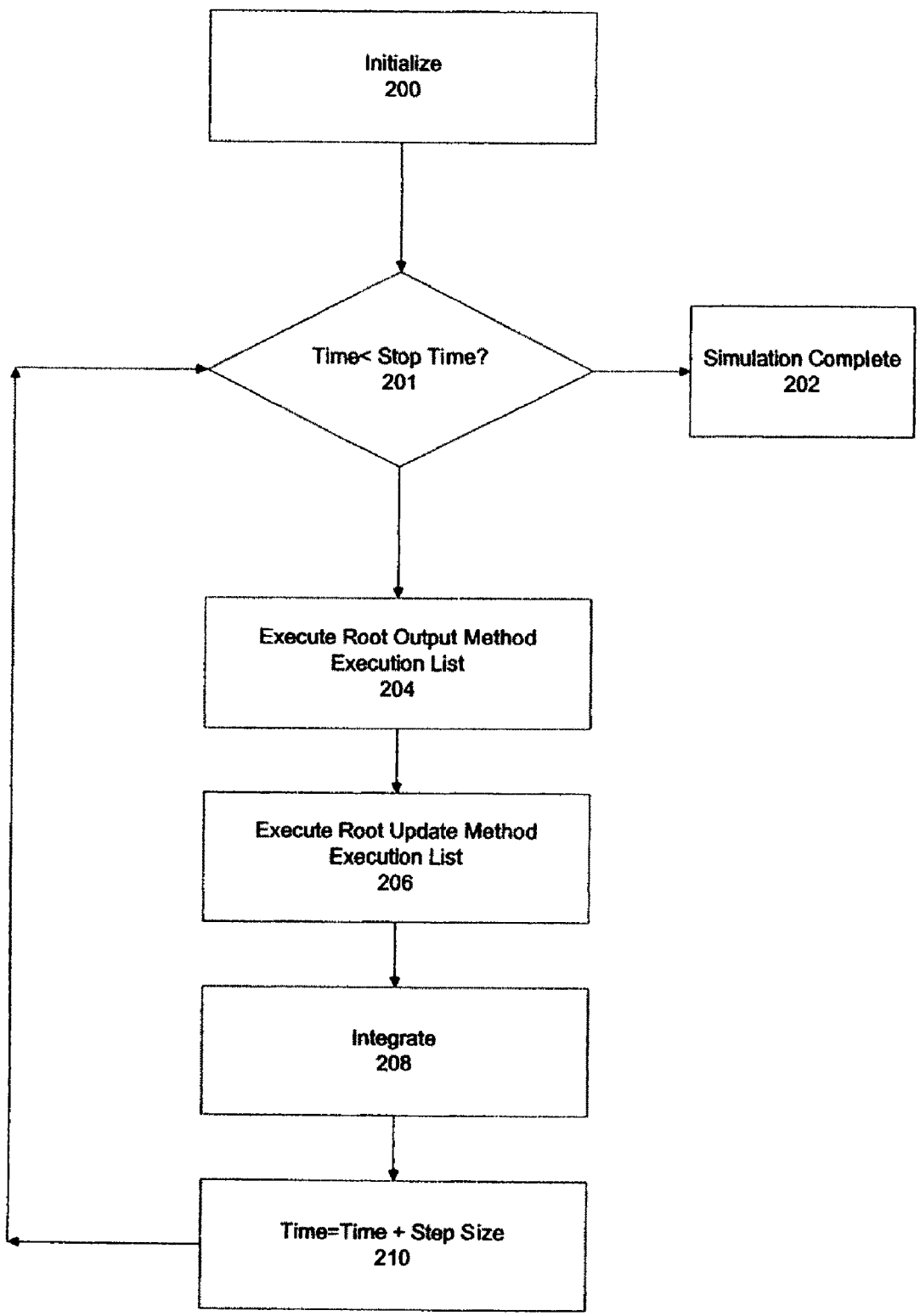
FIG. 10 is a flowchart of the sequence of steps followed by a single-tasking execution loop.

In a single-tasking SimLoop, there is essentially a single execution time-line. On this time-line, each block is executed when it has a sample hit. A sample hit is defined to be an execution time instant that is an integer multiple of the block's sample time. To aid in execution, execution lists are constructed for each method type. FIG. 10 depicts the sequence of steps followed by a single-tasking execution loop. Following initialization (step 200), a time parameter is checked to see if the current time is less than the stop time (step 201). If the time is not less than the stop time, the simulation ends (step 202). If the time is less than the stop time, the simulation continues and the root output method execution list is executed (step 204). Following execution of the output method list (step 204) the update method execution list is executed (step 206). Following the performance of an integrate step (208) (the Integrate step is described in more detail below in FIG. 14), the time parameter is incremented by the applicable step size (step 210).

Figure 11A:
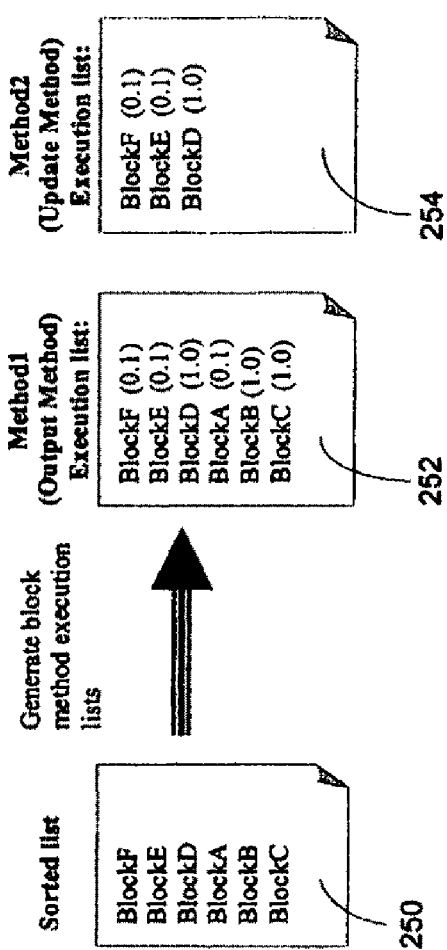
FIG. 11A depicts the creation of execution lists from sorted lists in single task mode.

Blocks are arranged in the single-tasking execution lists in the sorted order as shown in FIG. 11A. A sorted list 250 is used to generate an Output method execution list 252 and an Update method execution list 254. Referring back to the example in FIGS. 7 and 8, the engine sequentially steps through and execute each block in the block method execution list when the execution time divided by the sample time equals an integer number (1, 2, 3, 4, etc.). At time zero ($T_0$), all the blocks are executed. This involves executing the Output methods for blocks F, E, D, A, B, and C (in this order as dictated by the sorted list) and then executing the Update methods of blocks F, E, and D (again, in this order based on the sorted list). The execution time then is then incremented by step size, which in this case is assumed to be 0.1 seconds. Execution then commences once again at the top of the loop for T=0.1 ($T_{0.1}$). Blocks F and E have a sample time of 0.1 seconds and have a sample hit (0.1÷0.1=1, sample time is an integer multiple of the execution time), so the output block methods for Blocks F and E are executed. Block D, however, has a 1.0 second sample time and has no sample hit (0.1÷1.0=0.1, sample time is not an integer multiple of the execution time), so its output block method is not executed (essentially it is skipped). Block A, like Blocks F and E, has a 0.1 second sample time and so its output block method is executed. Blocks B and C, like Block D, have 1.0 second sample times and are skipped during this iteration of the simulation loop, which completes execution of the output block method execution list for $T_{0.1}$.

The execution timing of the example block diagram in single task mode is shown in the first time-line of FIG. 1B. In this diagram, note that the execution-time is not synchronized with real-world time. Instead, execution time progresses as fast as it can in real-world time. The sorted list 259 is executed on the time-line 260. The methods in the list 262 are executed at the appropriate time step 264. Block diagram modeling software can also allow users to simulate real-world conditions by synchronizing execution time with real-world time. Such execution is illustrated in the second timing diagram of FIG. 11B. The methods 262 are implemented at a time-step 264 synchronized with real world time on the time line 270.

Figure 12A:
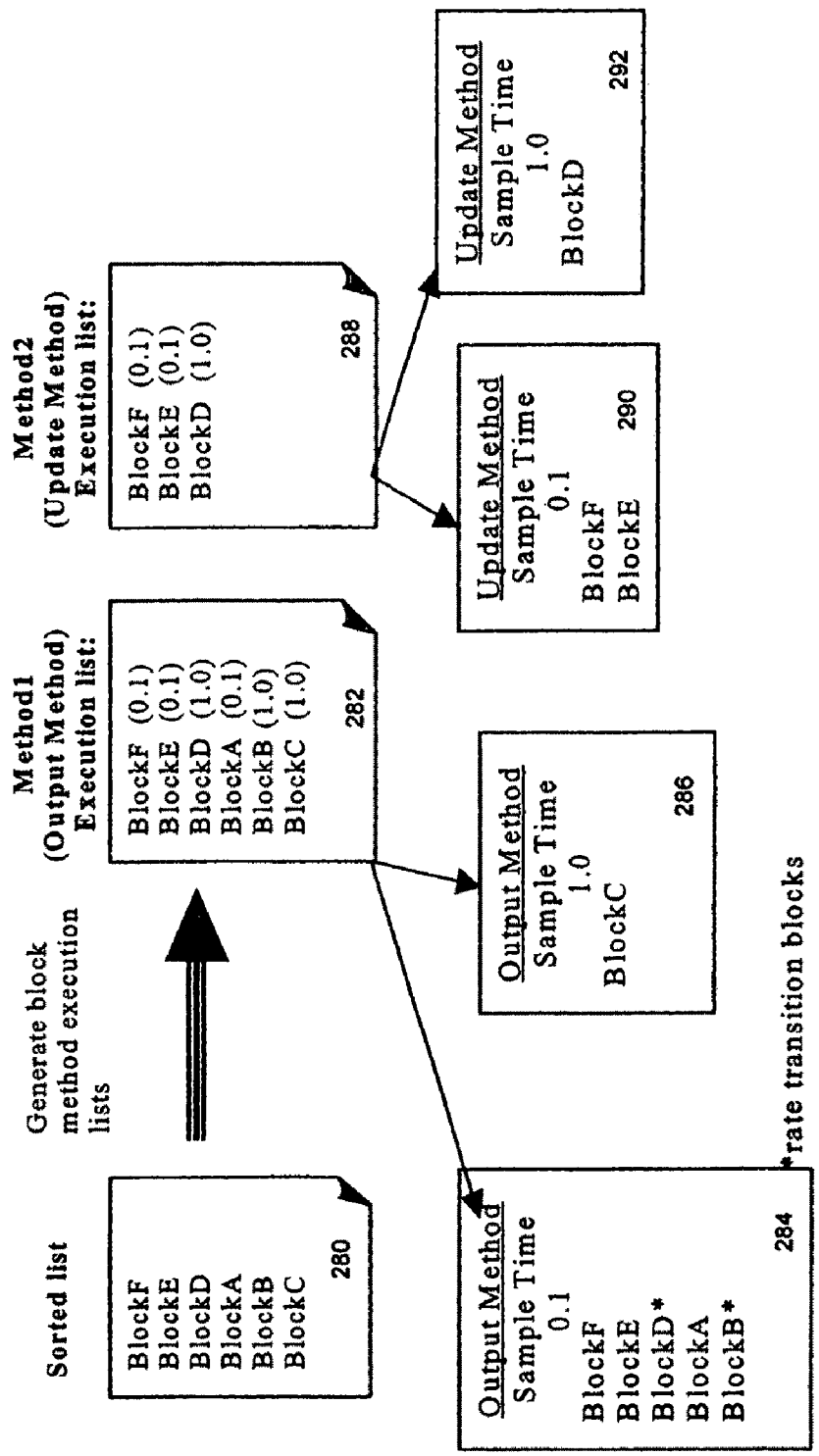
FIG. 12A depicts the creation of execution lists from sorted lists in multi-task mode.
Figure 13:
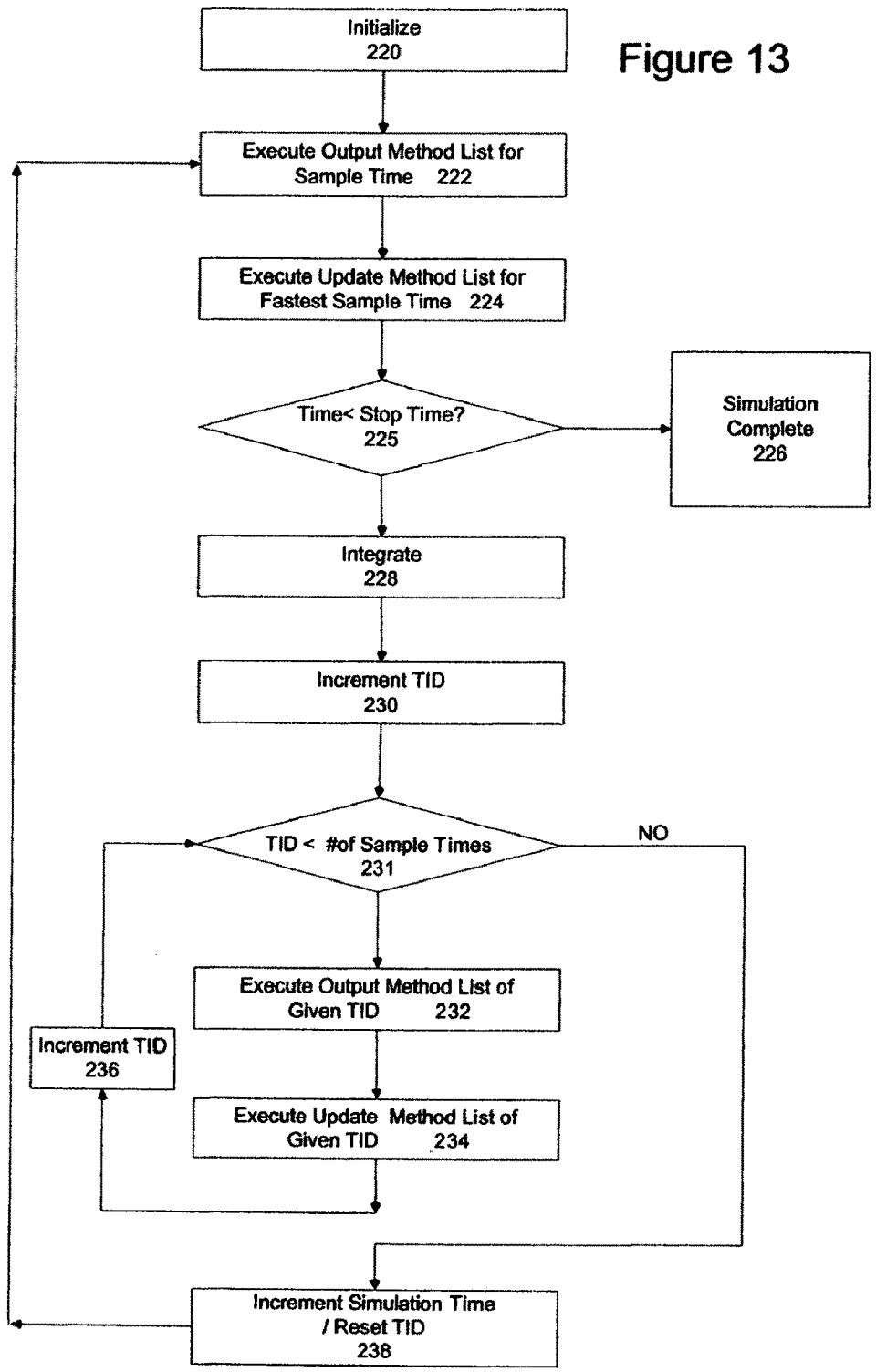
FIG. 13 is a flowchart of the overall sequence of steps taken by Simulink in multi-task mode.

In multitask mode, the engine performs execution along multiple time-lines based upon the number of block sample times used in the mode as shown in the flowchart of FIG. 13. In the example of FIGS. 7 and 8, the model's blocks have a sample time of either 0.1 seconds or 1.0 second. This implies that the engine runs one set of blocks along a 0.1 second time line and another set of blocks along a 1.0 second time line. In order to run in multitask mode, the execution lists are first divided on the basis of methods (as in single-tasking mode) and then subdivided again based upon block sample times. This is illustrated in FIG. 12A. The sorted list 280 is used to generate an output method execution list 282 and update method execution list 288. The output method execution list 282 is split into two separate list execution lists 284 and 286 based on sample times. Similarly, the update method execution list 288 is divided into two update method execution lists 290 and 292 based on sample times.

The execution engine uses the divided execution lists to create multiple execution time lines. In the multitask mode the engine places a higher execution priority on the faster sample time blocks than the slower sample time blocks. This prioritization is carried out by assigning Task Identification Numbers (TIDs) to each execution list; the higher the priority, the lower the TID. For example, a TID of 0 executes at a higher priority than a TID of 1, and so forth. Furthermore, because, during execution in multitask mode, execution transitions between the faster and slower blocks, and vice-versa, the multitask mode requires rate transition blocks that allow the model to transition from blocks running at fast sample times, in our example 0.1 seconds, to slower samples times, e.g., 1.0 seconds. The rate transition blocks are required to correctly simulate how a multi-rate system would behave in a real-time environment. To provide this transition, the engine promotes rate transition blocks to the TID of the fast block for which transition is being provided, although the engine executes these rate transition blocks at their slower rate. This is why Blocks D and B appear in the 0.1 sample time output method execution list in FIG. 12A.

Figure 12B:
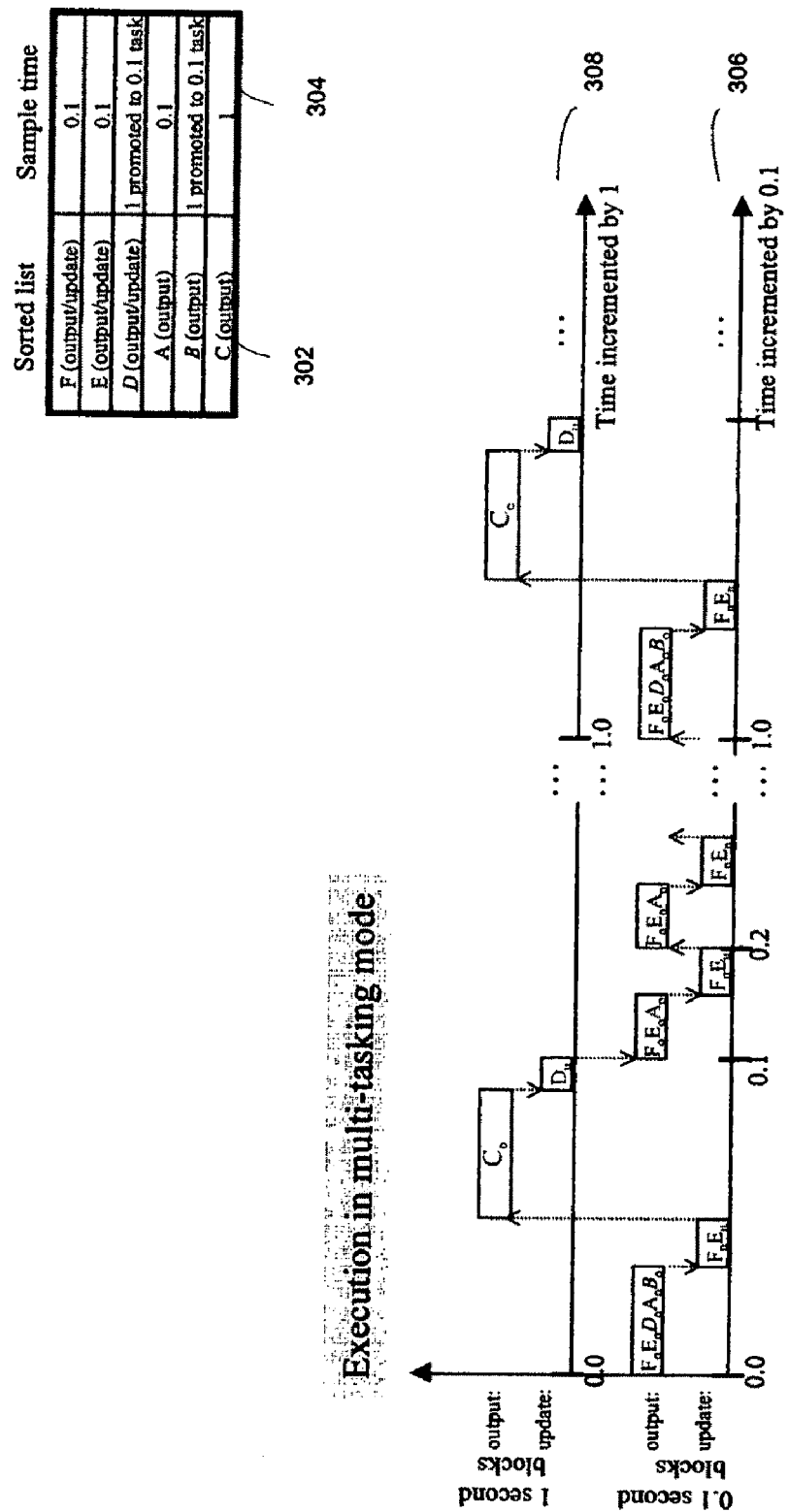
FIG. 12B depicts the execution timing of block diagrams in multi-task mode.

The execution of our example in the multi-task mode may be seen in FIG. 12B. At time T=0, the engine first executes the high priority output methods (those with TID 0) for Blocks F, E, D, A and B, then it executes the high priority update methods (those with TID 0) for Blocks F and E. After finishing the high priority blocks, the engine executes the lower priority output block methods (those with TID 1) for Block C, and then executes the lower priority update methods (those with TID 1), which, in this example, is Block D. In contrast to the single task mode, in multitask mode the engine runs through a TID inner loop to execute the output and update block methods before going on to the Integration step, as the flow chart in FIG. 13 which is discussed below illustrates.

As a result of the inner TID loop, as well as the segregated block method execution lists, the order of execution in multitask mode differs from the order of execution in single task mode. Recall for the example that in single task mode that the order of execution at T=0 is: $F_o, E_o, D_o, A_o, B_o, C_o, F_u, E_u$, and $D_u$ where the subscript "o" stands for output method and the subscript "u" stands for update method. In the multitask mode, however, the order of execution at T=0 is: $F_o, E_o, D_o, A_o, B_o, F_u, E_u, C_o$, and $D_u$. Notice that $C_o$ is executed in a different order in multitasking mode. This occurs because separate method execution lists (based upon sample time) are created and run in order from fastest sample time to slowest sample time. Additionally, the use of rate transition blocks restricts the connection of blocks with different rates. By requiring the insertion of these blocks into the model, the engine ensures that execution in multitask mode will follow the sorted list.

After it is finished executing the block methods for T=0, like in the single task mode, the execution time is incremented (again assume by 0.1 seconds) and execution goes to the beginning of the loop. The engine executes $F_o, E_o, A_o, F_u$, and $E_u$, and the engine does not execute the block methods of Blocks D, B, and C because the current execution time is not an integer multiple of those block's sample time. The engine repeats this execution until the execution time is incremented to 1.0 seconds, whereupon execution occurs in the same manner as described for T=0. The engine repeats this overall process until the execution stop time is reached.

FIG. 12B shows two time-lines; the lower time-line 306 represents the execution order of the faster sample time blocks (Blocks A, E, and F), along with the rate transition blocks (Blocks B and D), while the top time-line 308 shows the execution order of the slower sample time block (Block C), and the rate transition (Block D) update method. The time-lines are generated from the sorted list 302 and the associated sample times 304. The lower line, representing the faster sample times has a TID of 0, and the top line has a TID of 1. For execution time T=0, the chart shows that the engine executes the output methods for Blocks F, E, D, A, and B (designated on the chart as $F_o$, $E_o$, $D_o$, $A_o$, $B_o$). Then, consistent with the flow chart for the multi-tasking mode (see FIG. 13 discussed below), the engine executes the update block methods for Blocks F and E (designated $F_u$, and $E_u$). Once the engine is finished with the high priority block methods, the output method for Block C ($C_o$) and the update method for rate transition block D ($D_u$) are executed. The execution time is then incremented by the step size (continue to assume 0.1 seconds) and the blocks that have a sample hit are executed. The figure shows execution of $F_o$, $E_o$, $A_o$, $F_u$, and $E_u$, which is repeated, as noted above, until execution time equals 1.0 second. Notice, like in the non-real-time case for Single-task mode, the engine does not wait for time to elapse; rather it executes block methods immediately upon completion of the previous pass through the loop.

FIG. 13 shows the overall sequence of steps taken by Simulink in multitask mode. Following initialization (step 220), the output method execution list is executed for the fastest sample time (step 222). The update method execution list is then executed for the fastest sample time (step 224). A time parameter is checked (step 225) to determine if the time is less than a designated stop time. If the stop time has been reached, the simulation completes (step 226). Otherwise, the integrate stage (step 228) is performed. The task ID variable is incremented (step 230) and compared to a parameter of the number of sample times (step 231). If the task ID is less than the number of sample times, the output method execution list for the methods assigned the new task Id are executed (step 232) followed by the execution of the update method execution list assigned the new task ID (step 234). The task ID variable is incremented (step 236) and the process iterates with the task ID being compared to the number of sample rate times (step 231). When the task ID number is determined to equal the number of sample rate times, the simulation time is incremented (step 238) and the entire process iterates with the output method list execution list (step 222) being executed for the fastest sample times. The process continues until the end of simulation when the time equals the stop time (step 226).

In order to understand how the step size is picked within SimLoop, it is first necessary to understand the notion of a solver. The solver is a module of the execution engine that is responsible for performing two tasks: (a) determining how far execution time should be advanced between consecutive passes through the SimLoop in order to accurately trace the system's outputs, and (b) integrating the derivative of the states of the system to obtain the actual states. Based on how solvers perform the first task, they are generally classified into two basic classes: Fixed-step solvers or Variable-step solvers.

Fixed-step solvers are solvers in which the time step-size between consecutive passes through the SimLoop is a fixed quantity. The user generally explicitly specifies this quantity. These solvers are used to model types of systems that must operate within a defined time (discrete systems). For instance, an anti-lock braking system may be designed to control a car's braking system, and to execute such control in one-one hundredth (0.01) of a second so as to assure the car stops safely; if the braking system does not meet its timing constraints, the car may crash. Fixed-step solvers, therefore, are designed to help model discrete systems that have to generate a result in a fixed time period, and the fixed-step execution assures that the modeled system can generate such results.

Variable-step solvers are designed to model continuous systems where non-evenly spaced time steps are needed to simulate all significant behavior. For example, one may want to simulate the path of a bouncing ball, where it bounces, how high it bounces, and where it stops. It is known, based on experience, that the ball's bounces will not be evenly spaced, and that the height of the bounces will diminish as a result of gravity, friction, and other forces. Variable-step solvers are used for these types of continuous systems and to determine what step size to use so that the behavior of the ball will be accurately modeled.

The two broad classes of solvers are further subdivided based on the integration task they perform. There are several algorithms for carrying out numerical integration. The particular choice of the integration algorithm gives rise to the subclasses of solvers.

Figure 14:
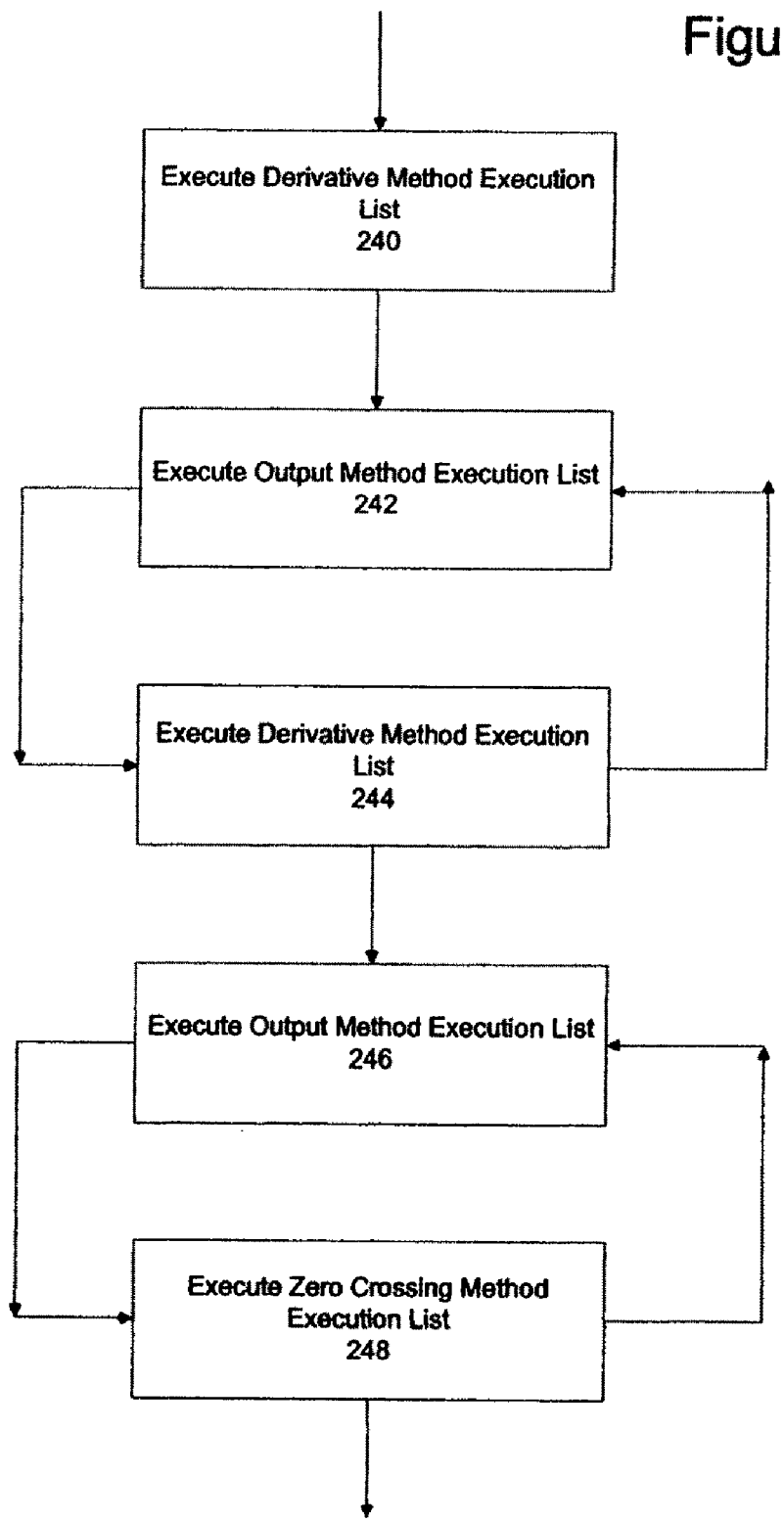
FIG. 14 is a flowchart of the sequence of steps followed by a variable-step solver.

The difference in the conceptual definition of Fixed- and Variable-step solvers leads to the functional difference in the context of the SimLoop. The major difference between the solvers arises in the Integrate step of the SimLoop which is depicted in FIG. 14. During the Integrate step, the Variable-step solver executes the Output and Derivative block method lists for a number of iterations that varies based on the solver subclass (i.e., the numerical integration algorithm it uses) and integration error tolerances. In a fixed-step solver, the number of iterations is fixed for a given solver subclass. Another difference between solvers arises in the Integrate phase in the context of an operation known as zero-crossing detection. Zero-crossings in the derivatives of the state generally indicate a discontinuity in the states themselves. Because discontinuities often indicate a significant change in a dynamic system, it is important to trace the system outputs precisely at such points. Otherwise, the outputs of the model could lead to false conclusions about the behavior of the system under investigation. Consider, again the example of the bouncing ball. If the point at which the ball hits the floor occurs between simulation steps, the simulated ball appears to reverse position in midair. This might lead an investigator to false conclusions about the physics of the bouncing ball. To avoid such misleading conclusions, it is important that the execution has time steps on and around the vicinity of discontinuities.

In the case of Fixed-step solvers, there is no notion of zero-crossing detection and one is not guaranteed to find all points of discontinuity. One can only keep reducing the step-size to increase the probability of hitting the discontinuity. Contrastingly, in the case of Variable-step solvers, the Integrate step explicitly includes zero-crossing detection. The execution step size is then adjusted accordingly to ensure that discontinuities are tracked accurately. To enable zero-crossing detection, blocks that can produce discontinuities instantiate a special execution method. This method registers a set of zero-crossing variables with the execution engine, each of which is a function of a state variable that can have a discontinuity. The zero-crossing function passes through zero from a positive or negative value when the corresponding discontinuity occurs. During the zero-crossing detection phase of the Integration step, the engine asks each block that has registered zero-crossing variables to update the variables for the projected time of the next time step. These variables are then checked for a change of sign since the current step. Such a change indicates the presence of a discontinuity. An iterative process then tries to narrow down the location of the discontinuity and ensure that the next few time steps (at least 2) accurately bracket the location of the discontinuity. The final difference, which is in the step-size during execution, is a direct consequence of the two previous differences in the step-size determination. In Fixed-step solvers, the step size is a known and fixed quantity. For Variable-step solvers, the step size is determined during the integration iterations and the zero-crossing detection that happens during the Integration step.

An example of the variable-step solver is shown in FIG. 14, the derivative method execution list is executed (step 240) followed by the output method execution list (step 242). The derivative method execution list is then executed again (step 244) and the solver iterates between the execution of the output method execution list (step 242) and the execution of the derivative method execution list (step 244). A similar iteration loop then occurs between the execution of the output method execution list (step 246) and the execution of the zero-crossing method execution list (step 248). Note that Simulink also includes other methods such as Projections and Jacobians in this step as needed.

While it is theoretically possible to have Variable-step solvers in the context of multitasking, such a combination is not employed in practice. This is because the step-size for such solvers can become very small making it impossible to keep up with the real-time constraint that generally goes along with multitasking execution. An added complication is that the integration step in such solvers is iterative and takes varying amounts of time at each step of the execution. Therefore, Variable-step solvers are generally used only in conjunction with the Single-Tasking SimLoop. Additionally, they are not usually employed in systems that need to operate in real-time.

When a model contains an algebraic loop, the engine calls a loop solving routine at each time step. The loop solver performs iterations and perturbations to determine the solution to the algebraic condition (if it can). One possible approach to solving the algebraic equation $F(z)=0$, is to use Newton's method with weak line search and rank-one updates to a Jacobian matrix of partial derivatives. Although the method is robust, it is possible to create loops for which the loop solver will not converge without a good initial guess for the algebraic states z. Special blocks are generally provided to specify an initial guess of the states in the algebraic loop.

Figure 15:
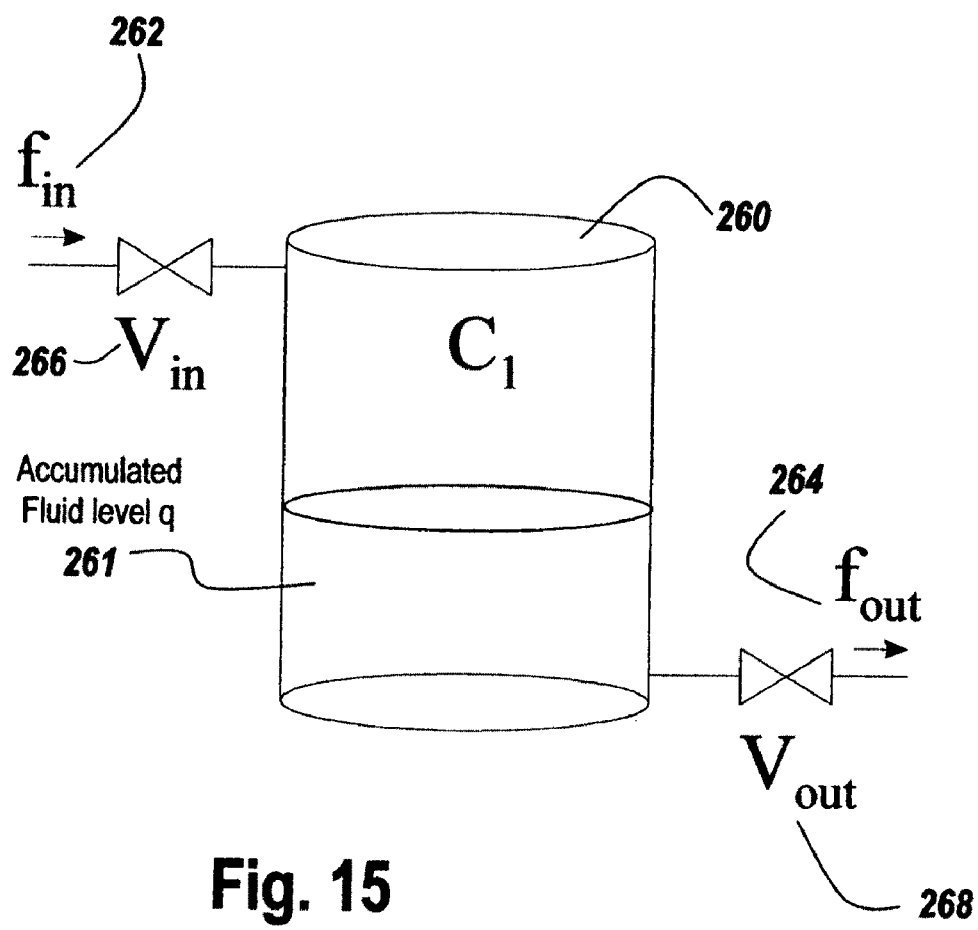
FIG. 15 depicts a single tank system at a steady state.

A steady state represents the point of equilibrium in a system. It is therefore often desirable to simulate the effects on a system that is operating at a steady state. The concept of a steady state may be explained with reference to the tank, $C_1$ 260 depicted in FIG. 15 which includes an input valve 266 and an output valve 268. Initially, the tank 260 may be empty and when there is an inflow, $f_{in}$ 262, it starts to fill. As it fills, the tank 260 accumulates fluid 261 the level of which causes a fluid flow out of the tank, $f_{out}$ 264. After an initial period of time, the level of the accumulated fluid 261 is such that the corresponding outflow 264 equals the inflow 262, and, therefore, the level remains constant. The system is then said to have reached steady state.

The variable that determines whether steady state has been reached in this system is the accumulated fluid 261 contained in the tank 260. Once the accumulated fluid 261 does not change anymore, i.e., its time derivative is 0, the system is in steady state. In general, variables such as accumulated fluid 261 are referred to as state variables as they capture the internal state of a system. For example, if the inflow 262 is turned off, there may still be an outflow 264, which is determined by the level of the accumulated fluid 261. In general, the output of a system is determined by its input and its state. To reconstruct the output of a system at a given point in time, one must know more than the input, one must know the state.

When the system is initialized with the state values that correspond to steady state, the time derivatives of all state variables are 0 (by definition). For the tank 260 in FIG. 15 accumulated fluid q 261 may be used to compute the pressure on the output valve, $p_{out}$, by $p_{out}=q/C_1$. The fluid flow out of the tank $f_{out}$ may then be computed by $f_{out}=p_{out}/R_{out}$, with $R_{out}$ the resistance of the outflow valve 268. And, finally, from this the time derivative of the liquid can be computed as $dq/dt=f_{in}-f_{out}$. By inverting the system, the required steady state values can be computed from the requirement that their time derivative equals 0. For example, for the tank system, setting the change in accumulated fluid, $dq/dt$, to 0 requires the inflow to equal the outflow by $dq/dt=f_{in}-f_{out}$. Given the inflow, the outflow is known and from this accumulated fluid 261 can be computed by $q=p_{out}*C_1$, as the value that gives the required pressure drop across the outflow pipe to cause that flow, $p_{out}=f_{out}*R_{out}$. For linear continuous time differential equation models this computation can typically be performed (given regularity constraints on the system matrices).

In general a closed form solution to the steady state constraints cannot be derived. This is especially true when non-linearities, in particular discrete state transitions, and look-up tables are present in the model. In such a case, the model state that corresponds to "pseudo steady state" has to be found by simulating the model till the dynamics of its behavior have settled. Once this is achieved, further analyses can start from this point in simulated time onward. Consider the two tanks 280 and 282 in FIG. 16. They are connected by a latch 284 that can open to the left or to the right, as shown in FIG. 17. The initial position of the latch 284 is closed 285, straight up. Once the latch 284 opens to the left 286 or to the right 288, it drops a little and cannot open in the opposite direction anymore. The latch 284 may subsequently close 290 and 292 but cannot open in the other direction because of the drop. There is no closed form solution to the steady state of this system. Just setting the time derivative of the liquid levels to 0 does not determine the state of the latch.

Figure 18:
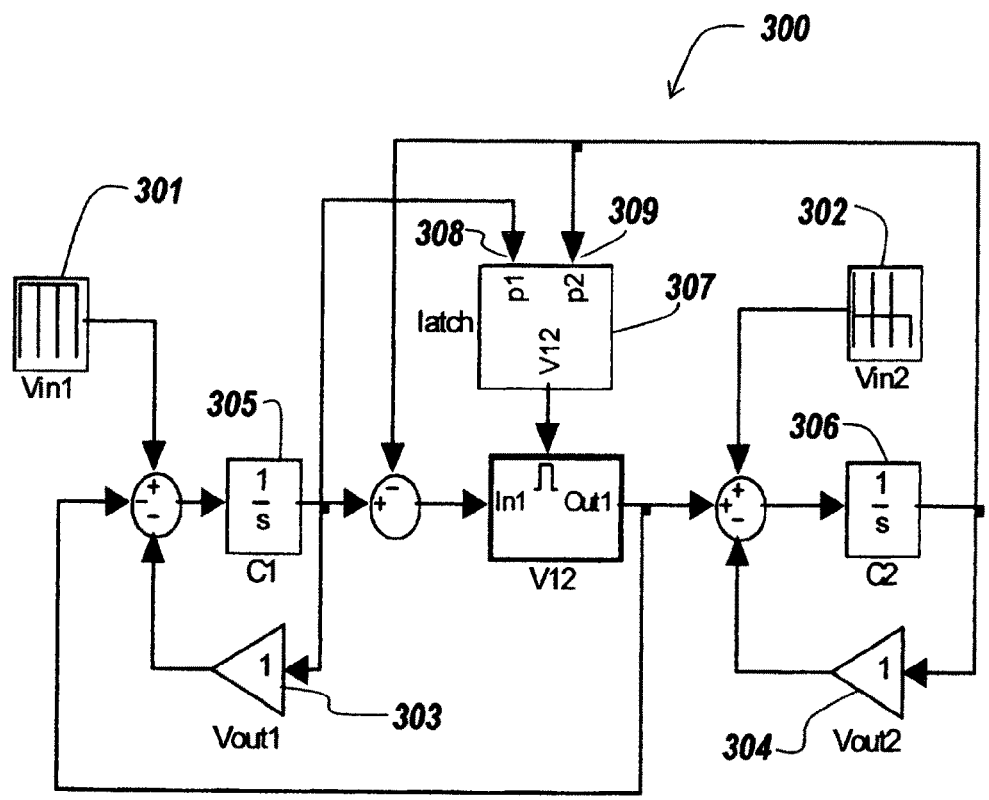
FIG. 18 depicts a Simulink model of the system of FIG. 16.
Figure 19:
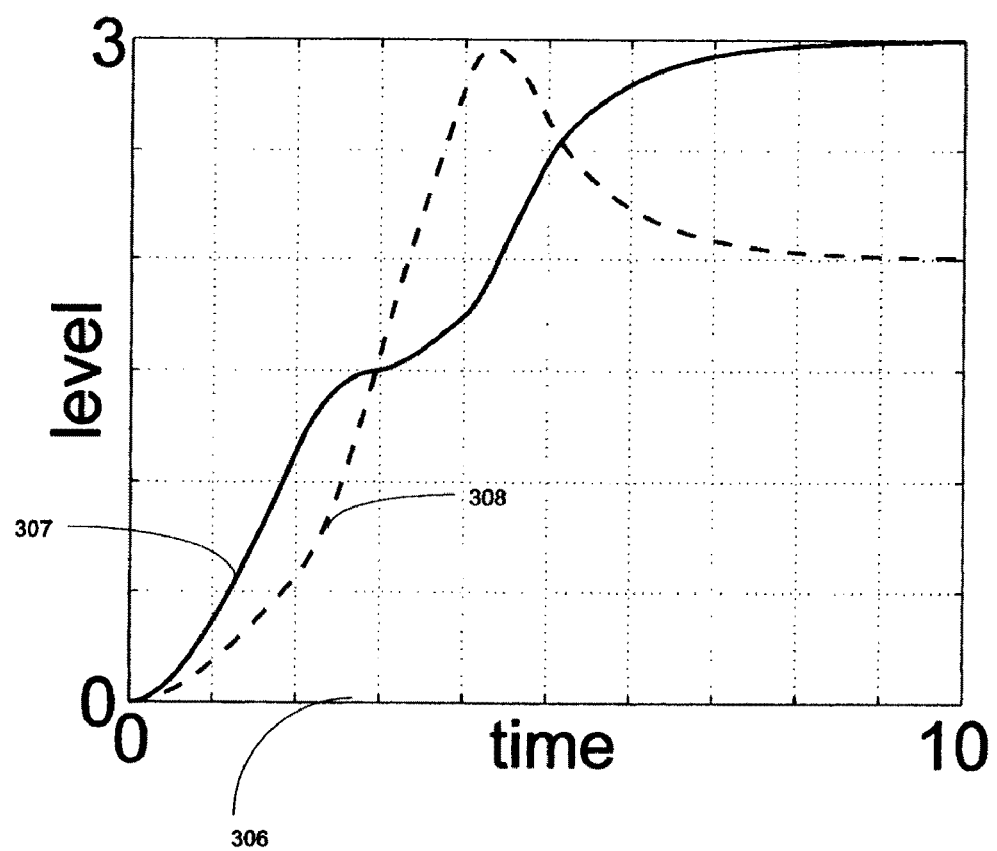
FIG. 19 depicts a pressure graph generated by the simulation of the model of FIG. 18.
Figure 20:
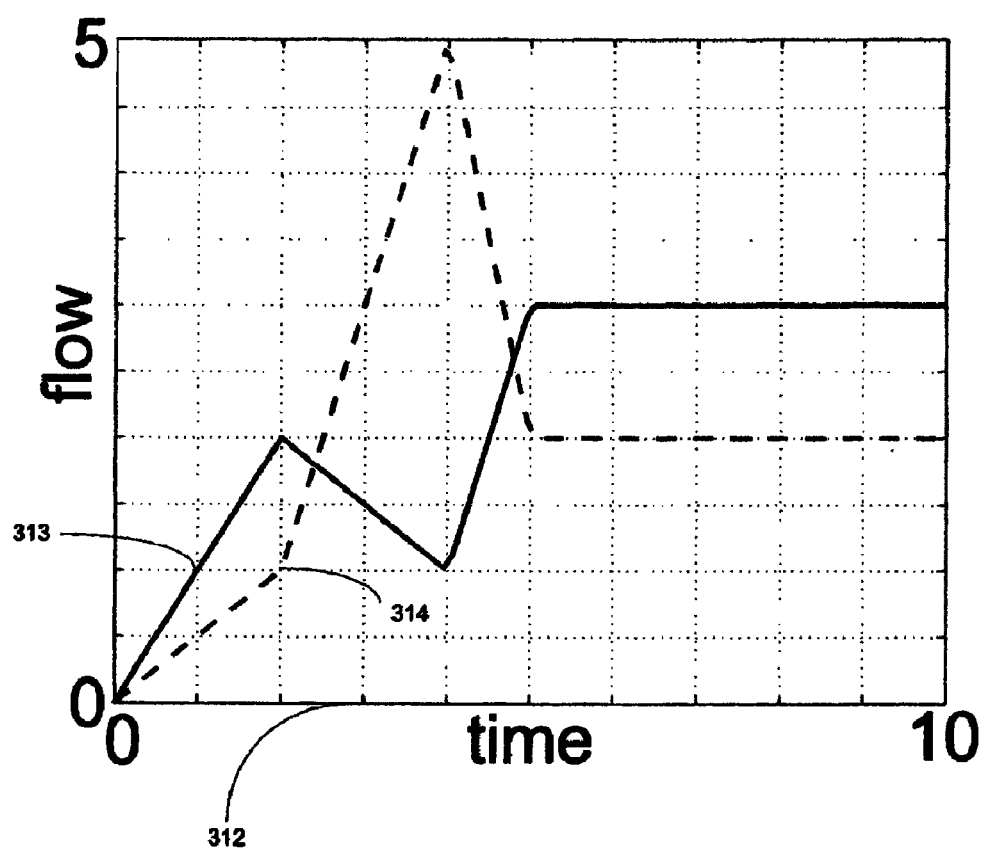
FIG. 20 depicts a start-up procedure graph generated by the simulation of the model of FIG. 18.
Figure 21:
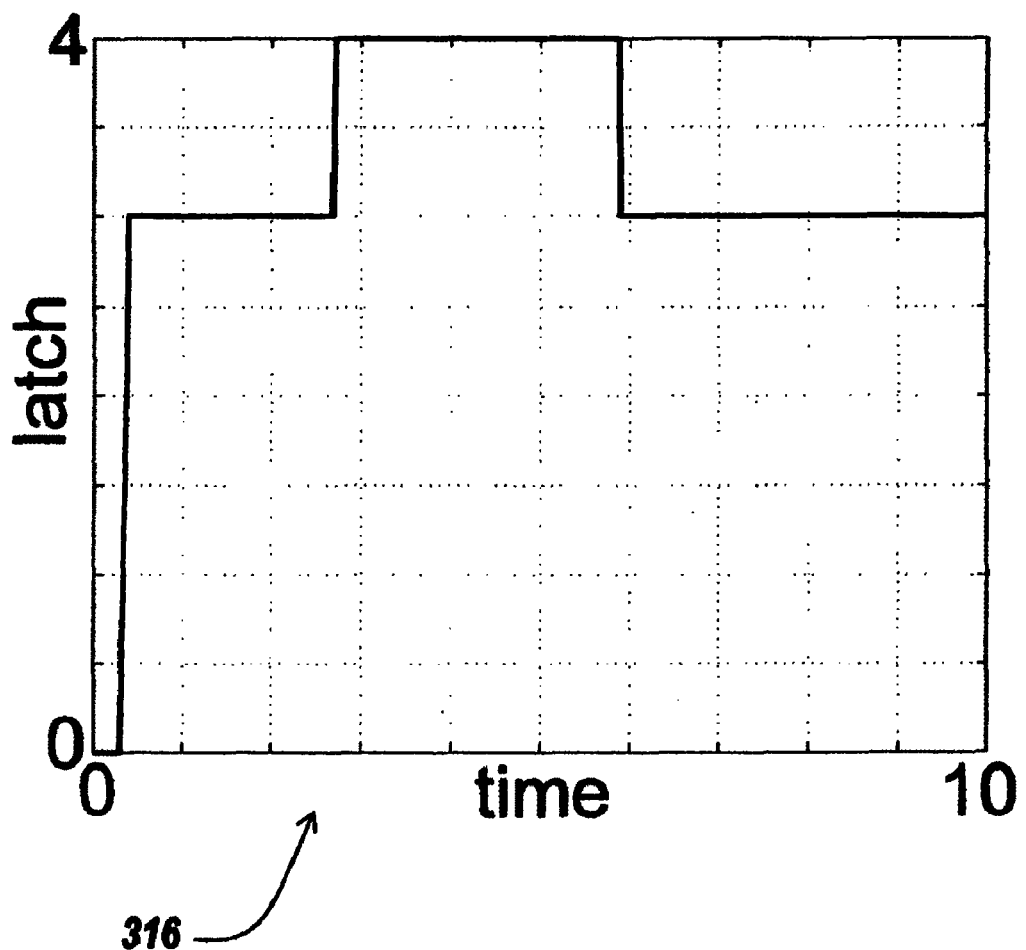
FIG. 21 depicts a latch state graph generated by the simulation of the model of FIG. 18.

In order to find the steady state, the system has to be simulated for a period of time. FIG. 18 shows a Simulink model 300 for the latched two tank system of FIG. 16. The model includes blocks for the Vin1 301 and Vin2 302 which produce a sequence of values representing the value of the inflow into the tanks during the start up sequence. Also included in the model 300 are a Vout1 block 303 and Vout2 block 304 representing the value of the outflow from the two tanks. The model also includes two integrator blocks C1 305 and C2 306 which represent state variables indicating the amount of liquid in the two tanks. The latch block 307 is also represented in the model. The two pressure inputs p1 308 and p2 309 compute differential pressures which determine whether the valve opens or shuts. The pressure graph 306 which is shown in FIG. 19 is caused by the start up procedure graph 312 depicted in FIG. 20. The yellow curve 307 in FIG. 19 represents the pressure at the bottom of C1 over time, while the magenta curve 308 represents the pressure at the bottom of C2 over time. In FIG. 20 the yellow curve 313 represents the inflow $f_{in,1}$ over time while the magenta curve 314 represents the inflow $f_{in,2}$ over time. After a short period of time, the latch opens to the right, then closes as the pressure in tank C2 exceeds that in C1 and then opens again once the pressure difference changes sign 316 as depicted in FIG. 21. After the system has reached steady state, the liquid levels and latch state are known. For example, the two tanks 280 and 282 in FIG. 16 can be simulated until steady state is reached. The state of the system can then be saved, i.e., the values for the liquid levels and the state of the latch is written to file.

Figure 16:
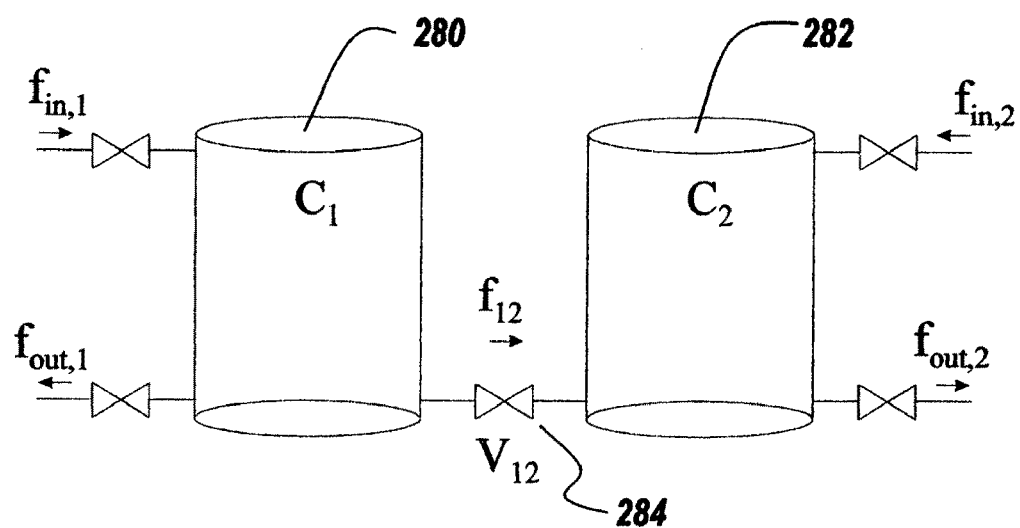
FIG. 16 depicts a two tank system connected by a latch which assumes an orientation during transition.
Figure 17:
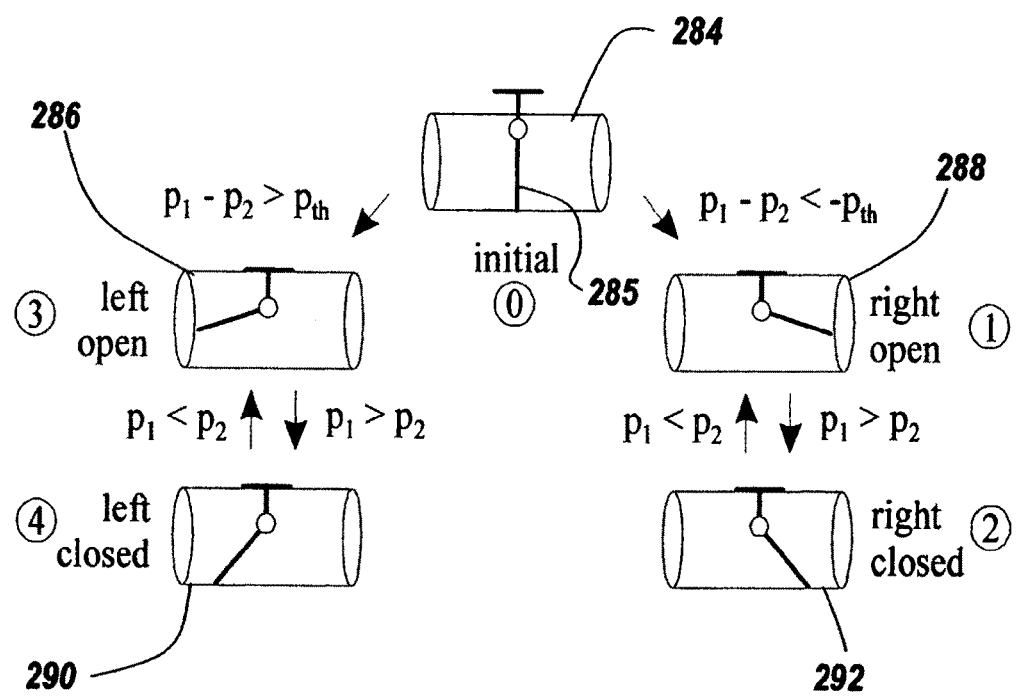
FIG. 17 depicts the different states assumable by the latch of FIG. 16.

The issue of discrepancies caused by imperfect continued simulation may be seen by examining the two tank system of FIG. 16 when the latch is initially in its left open state (i.e., it may allow flow from $C_2$ 282 to $C_1$ 280 but not reversed). FIG.

Figure 22A:
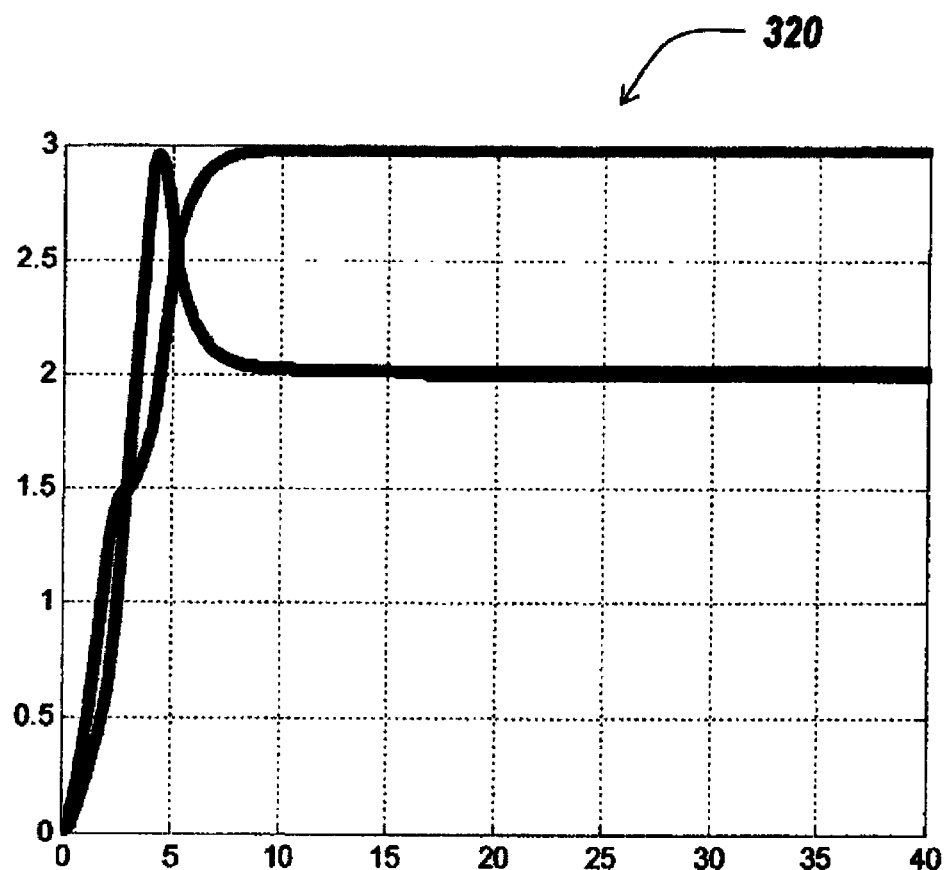
FIG. 22A depicts a graph of the simulation of the system of FIG. 16 until the fifteen second mark and its subsequent continuation until the forty second mark.
Figure 22B:
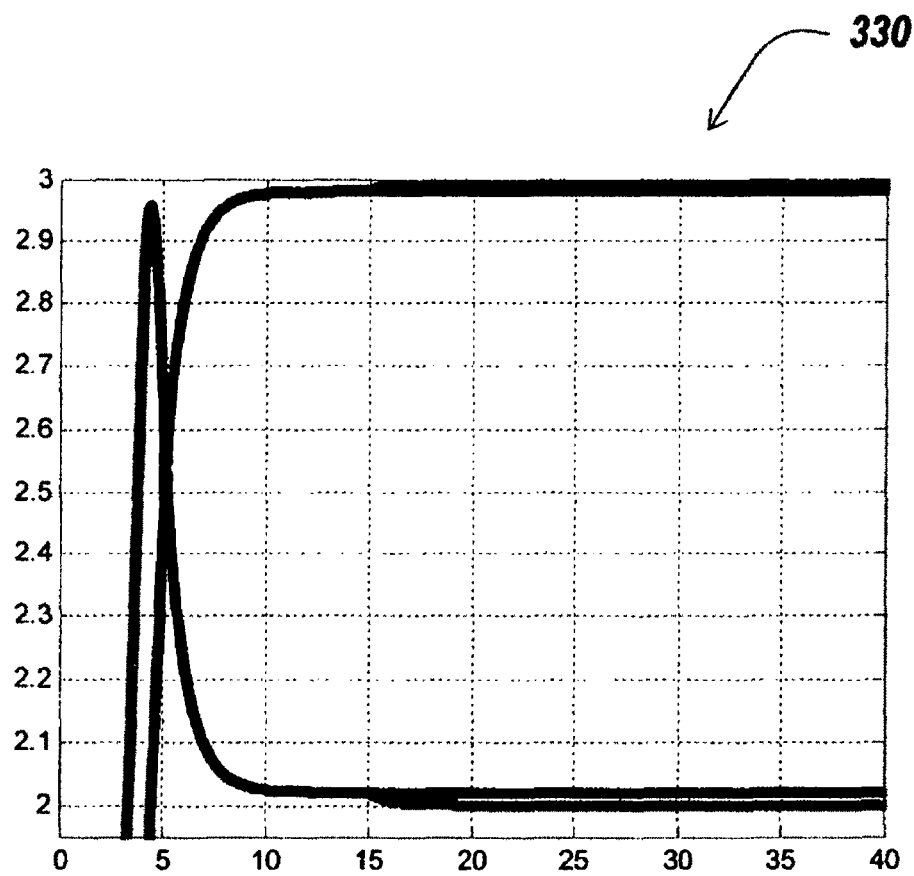
FIG. 22B depicts a graph of the simulation of the system of FIG. 16 using saved settings from the initial 15 second simulation of FIG. 22A which do not include the initial output of the subsystem used to model the latch.

22A shows the simulation 320 of this system until 15 [s], the state is saved, and simulation is stopped. The state is then reloaded and simulation is continued until 40 [s]. One continuous simulation until 40 [s] is performed as well and shown in the same figure. Note the discrepancy in results shown in FIG. 22B for the new simulation 330 using the saved enabled subsystem because the saved state does not include the initial output of the enabled subsystem that is used to model the latch (i.e., the flow from $C_1$ to $C_2$). Since this output is not reset when disabled (e.g. to model small leakages), it differs from 0, and, therefore, needs to be restored to achieve bit for bit accuracy compared to an uninterrupted simulation. The illustrative embodiment of the present invention prevents this sort of discrepancy by saving the simulator context in addition to the system state.

Figure 23:
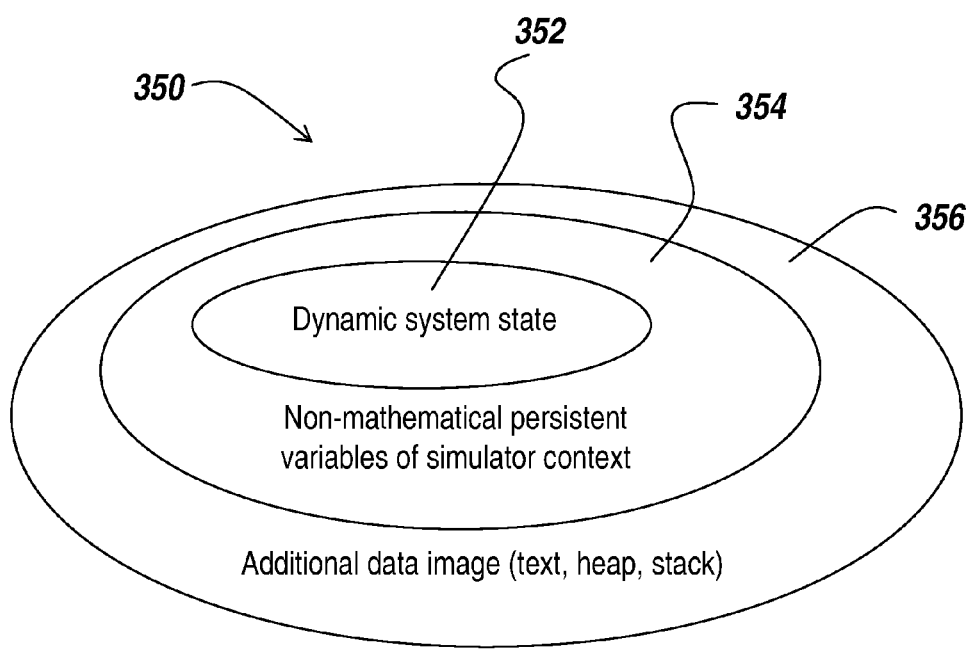
FIG. 23 depicts a block diagram of the components of a simulator image.

FIG. 23 shows the entirety of the simulator image 350. The simulator image 350 includes three sections, the dynamic system state 352, the simulation context 354 and additional image data 356 such as text, heap and stack data. Those skilled in the art will recognize that the present invention allows saving more than strictly the simulator context 354. In the extreme case, the entire simulator image 350 can be stored and restored including some or all of the additional image data 356. However, for efficiency reasons, the preferred embodiment operates on the minimal amount of memory needed and saves only the system state and simulator context. When simulation is continued after restoring the context of a model, if the model is not changed, the simulation trajectory is exactly the same (bit for bit) as the uninterrupted trajectory.

Figure 24:
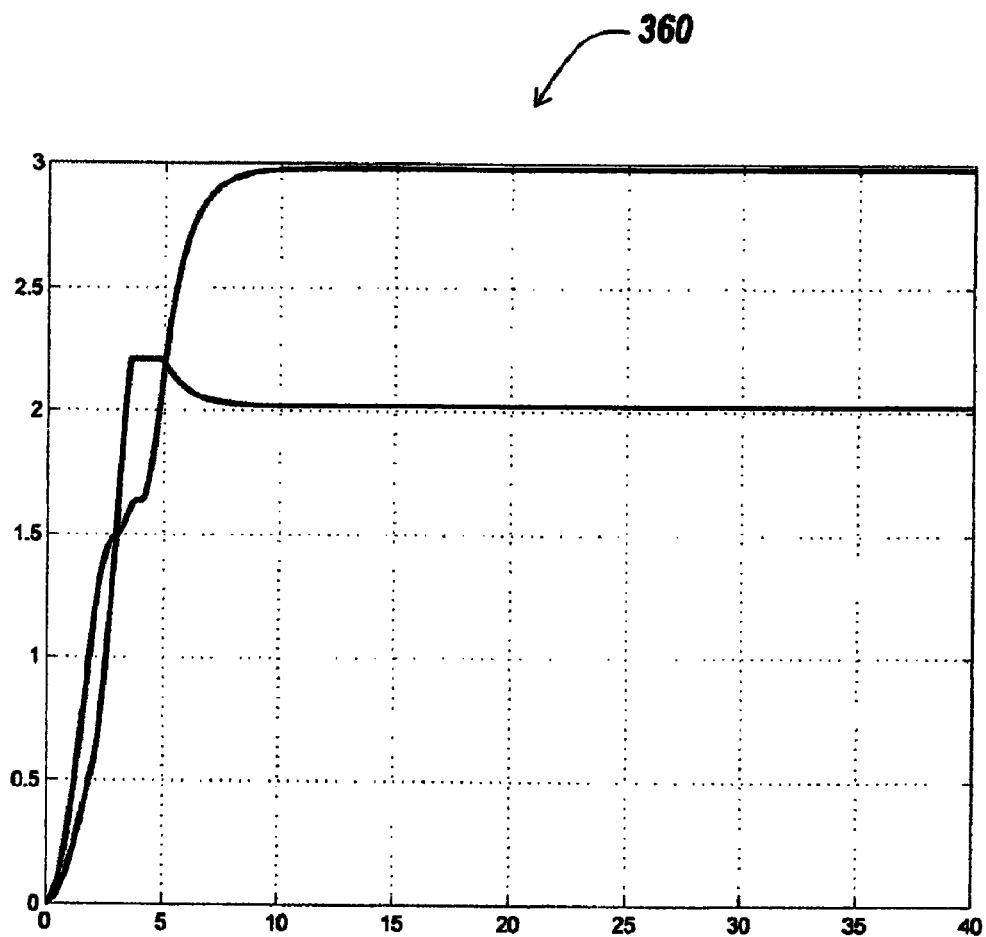
FIG. 24 depicts a block diagram of a simulation using a saved simulation context according to the illustrative embodiment of the present invention and resulting in a correct simulation continuation.

The use of saved simulation context is illustrated in FIG. 24 which shows how the invention results in correct continuation compared to an uninterrupted simulation run. In FIG. 24, a model 360 replaces a tank with a user written block that acts as a limited integrator: When the fluid level reaches the value 2.2, the tank overflows and does not fill any further. This is implemented by the user-defined code if(xC[0]>2.2 && u0[0]>0)
dx[0]=0;
else
dx[0]=u0[0];

to compute the time derivative, dx[0], of the liquid in the tank, xC, for a given input, u0[0]. The amount of liquid represents the continuous state of the tank. The level of liquid is limited at 2.2. Without the saving of the simulation context, the fluid level is shown at 3.0 [s] in a new simulation run based only on restored system state.

The illustrative embodiment of the present invention overcomes the drawback of previous simulation continuation by providing a mechanism to store the entire simulation context, and a mechanism to restore the entire simulation context. In one aspect of the present invention, before simulation is started, a flag is set to store the context when simulation finishes (either because the final time is reached, simulation was interrupted by the user, or otherwise). Alternative procedures for querying whether the context should be stored or not may also be implemented (e.g., user interaction when a simulation is finished). Once the simulation finishes, the simulation context may be stored as a file, in a workspace parameter, or in some other format.

In one embodiment, the simulation context is stored to file. The file into which the simulation context is stored may be automatically named. However, a user-defined file may be used alternatively. The storage mechanism for saving the simulation context can vary from saving the context as memory dump, to saving the context memory as a platform independent textual dump through a conversion process. As long as there are no architectural incompatibilities between computer architectures involved there will be no differences in the results. Other implementations such as saving the context as a platform independent binary dump or a platform dependent textual dump are also within the scope of the present invention.

The user interface of the context restoration is achieved by starting the simulation with a corresponding 'continue simulation' command. This may be implemented as a parameter for the normal means to trigger simulation or any other way. A continued simulation takes as arguments all arguments (mandatory and optional) of an initial simulation such as final time and additional output times.

To store simulation, a 'StoreSimulationContext' flag is set on the particular model. Other implementations such as using graphical elements, may be used instead or in addition to the use of a flag. Additionally, the storage can be an activity that occurs during simulation (i.e., without interrupting a regulation simulation). To this end, the user may specify particular storage conditions (e.g., when a certain point in time is reached in simulation such as the achievement of a steady state or when particular values of model variables exist). This could result in a sequence of simulation context files with snapshots of the simulation context over the course of a simulation run.

Figure 25:
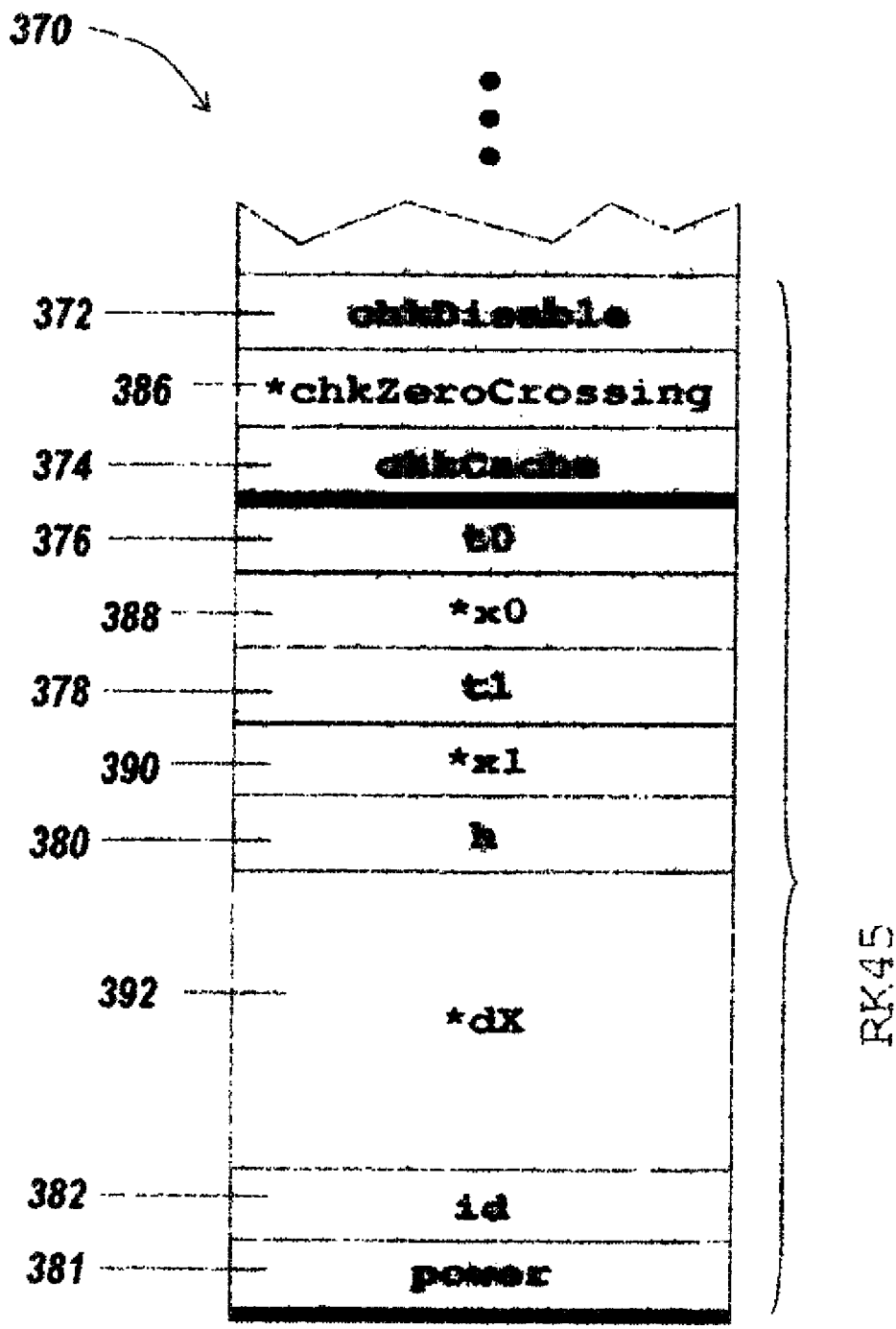
FIG. 25 depicts a block diagram of the allocated memory for a solver.

The illustrative embodiment of the present invention registers areas of memory that constitute the simulation context, and subsequently calls a procedure to store and restore the simulation context. In one embodiment, the simulation context related areas in memory are registered before a simulation is started. This is implemented by rerouting the general memory allocation call through a registration mechanism. A complication in storing and restoring the simulation context arises when aggregate variables mix references and values. To illustrate this, consider the attributes of a Runge-Kutta 45 solver. In its C++ implementation, the class RK45 is derived from VarStepSolver. The attributes of RK45 are RK45
double t0;
double *x0;
double t1;
double *x1;
double h;
double *dX[7];
bool projectInterpolant;
static const int id;
static const double power;

The definition reveals that an instance of RK45 contains value attributes and reference attributes. The references contain pointers specific to the particular simulation and they may differ between simulation runs. So, restoring these may result in invalid references, and, therefore, these should be excluded. FIG. 25 depicts part of the allocated memory 370 for an instance of RK45. The allocated memory includes value fields 372, 374, 376, 378, 380, 382 and 381 and reference fields 386, 388, 390 and 392.

Two basic approaches exist for tracking the simulation context memory allocations. A localized indexing scheme tracks the pertinent variables of an object that is part of the context. Alternatively, a global table may be maintained. The first approach lends itself well to the object-oriented coding paradigm whereas the second approach is more suitable to a procedural style of coding. Those skilled in the art will recognize that other methods of identifying and noting the portions of memory used by the simulation context may be employed within the scope of the present invention.

In the case of a global indexing scheme, the pertinent variables are identified by a special call when they are defined, i.e., when their memory is allocated. To this end, instead of calling standard run-time allocation procedure, an intermediate function call is used that calls the allocation procedure as done otherwise, but before it returns, it registers the allocated memory as being part of the context.

Note that the indexing scheme can be extended to store local model information to facilitate selective context restoration. As such, the context of a subsystem in a model can be identified and restored upon request, even in case of model changes elsewhere that affect the memory layout of those parts. The preferred embodiment tracks the instances of model parts and the memory they allocate, which is then assigned a unique identifier.

With the modularization of the numerical solvers, and the initiative to increasingly apply object-oriented coding principles, the need for a more distributed implementation has emerged. In this architecture, it becomes desirable not to have a global index of pertinent memory, but to maintain this locally for each object. A context sensitive object implements an access method to make its context available. Several implementations are possible. For example, an object could produce an index to each memory location that is part of the context and have the streaming operation performed by the caller, or it could stream the memory content itself.

This local indexing scheme supports selective memory restoration for parts of the model (e.g., one subsystem only) as it is object based. Indexing the origin in the model of context fragments, optionally combined with a conversion mechanism between type implementations, allows restoration between platforms and different compiled versions of models. This supports, e.g., having a controller reach a steady state operating point in simulation in combination with a detailed phenomenological plant model, storing the context, and then after generating code for the controller, using the same context to initialize the controller code.

The type of the indexing being used, centralized or distributed has to be selected. This is related to the coupling of the indexing to the memory allocation calls: A table keeps track of the parts of memory that are part of the context. When memory for an instance is allocated, it is indexed as being part of the context which allows restoring it. A straightforward approach indexes all the RK45 specific memory of this instance by <address, size> tuples. Given the base address of the RK45 instance and the size of its type, the entire part of memory is considered part of the context.

Figure 26B:
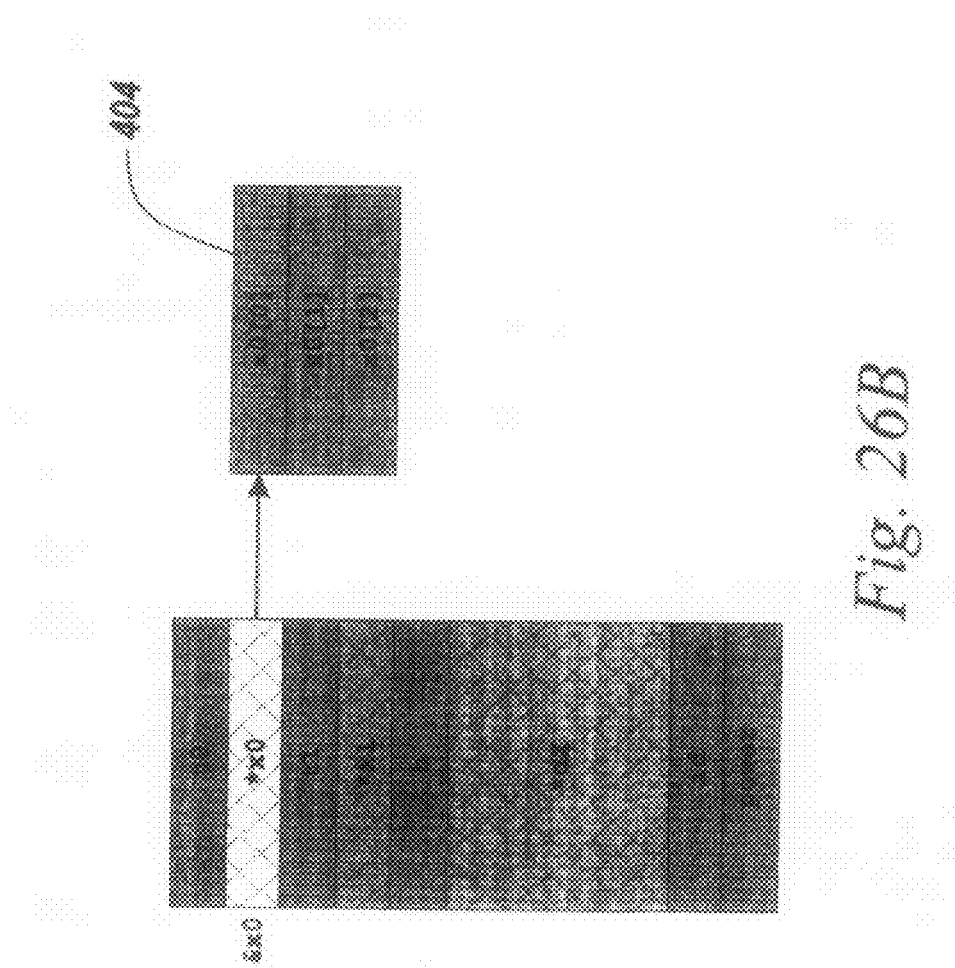
FIG. 26B depicts a block diagram of the allocated memory for a solver showing the part of memory holding both values and references and the parallel indexing of only references.
Figure 26A:
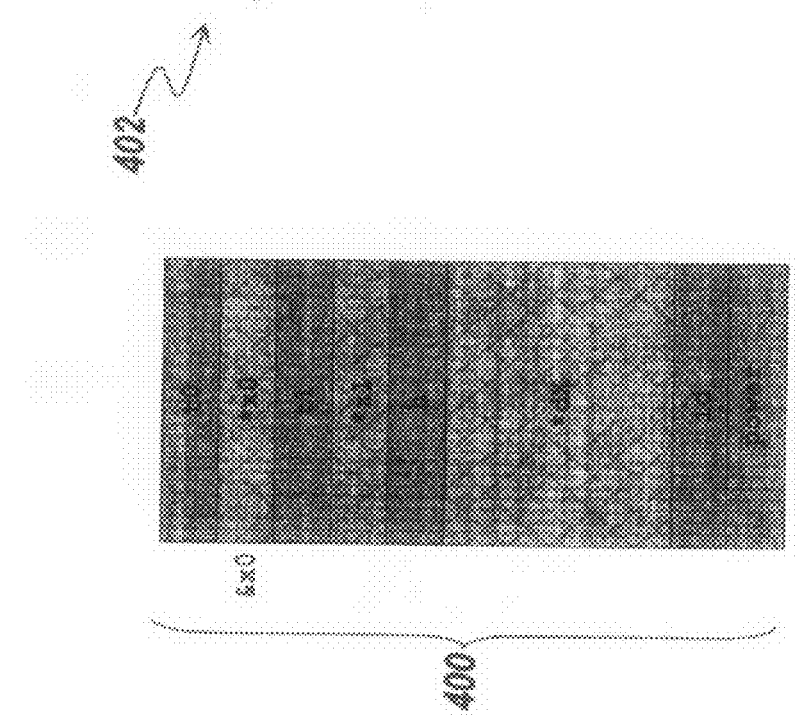
FIG. 26A depicts a block diagram of the allocated memory for a solver showing the part of memory holding both values and references.

In order to exempt the referencing part of memory, the memory allocation call for the referenced variables can be exploited. This prevents redundancy that would be required when the type definition would explicitly exclude referenced parts of memory. This approach is illustrated in FIG. 26A. When the RK45 instance is defined, an <address, size> tuple marks the corresponding part of memory 400, including both values and references. Next, when one of the referenced variables, x0, is defined, in FIG. 26B, an <address, size> tuple is created that marks the memory 402 where its values are located. In the same function, a <address, size> tuple is created as part of a parallel indexing scheme 404 that keeps track of areas in memory with references. Thus one implementation of the present invention includes two indexing schemes with <address, size> tuples, one for the context related memory with both values and references 400 and one for the parts of this memory 402 that contain references. This implementation allows the exploitation of allocation calls for indexing. Alternatively, the <address, size> tuple in the memory indexing scheme with references could be partitioned when one of these referenced variables is defined. This requires a somewhat more sophisticated registration mechanism. In an alternate implementation, the memory area is not dynamically constructed but hard-coded as the set of variables that are part of the context. Both indexing schemes are implemented and used in conjunction with one another.

Since the work arrays of user defined functions are part of the indexed memory, no additional effort is required to make a user defined block adhere to the restoration scheme as long as variables are declared through the standard interface. For example, the interface to declare continuous state variables is ssSetNumContStates(S, NUM_CONT_STATES), where S references the user-defined system and NUM_CONT_STATES the number of continuous states. To facilitate more flexibility, an option for the user to stream selected variables to and from file is also implemented for user defied blocks.

Due to the indexing scheme for the areas in memory that need to be stored and restored, a mechanism is required to invoke the indexing operations and to facilitate the context restoration. It is important to note that the memory that is part of the context is all allocated when a simulation run is requested. It has to be indexed anew before each simulation is executed because changes to the execution may have been made (e.g., a different solver may have been chosen).

The restoration process is implemented around the main simulation loop as shown in italics in the following code snippet:

```
int SimulateModel(slModel *model, CmdlInfo *cmdlInfo)
{
...
sm_SimStatus(model, SIMSTATUS_RUNNING);
if( slLoadContext(model)) ssSetTFinal(S, getCtxTFinal( ));
while (ssGetT(S) < ssGetTFinal(S)) {
...
}
slCtxStore(model); /*store context for possible continuation*/
if (!stopRequested) {
ssSetStopRequested(S,true);
errmsg = slDoOutputAndUpdate(model);
if (errmsg != SL\_NoError) return(errmsg);
}
...
return(errmsg);
} /* end SimulateModel */
```

Before a simulation starts, it is determined whether the simulation context needs to be restored by means of a call to slLoadContext which is executed in the same function call in cases where the restore flag is set. Once the context is restored, simulation proceeds as if invoked normally. Once completed, the indexed memory is stored by the slCtxStore call if the StoreSimulationContext flag of the block diagram is set by the user. The context is written to a file with an mcx extension in one implementation.

Figure 27:
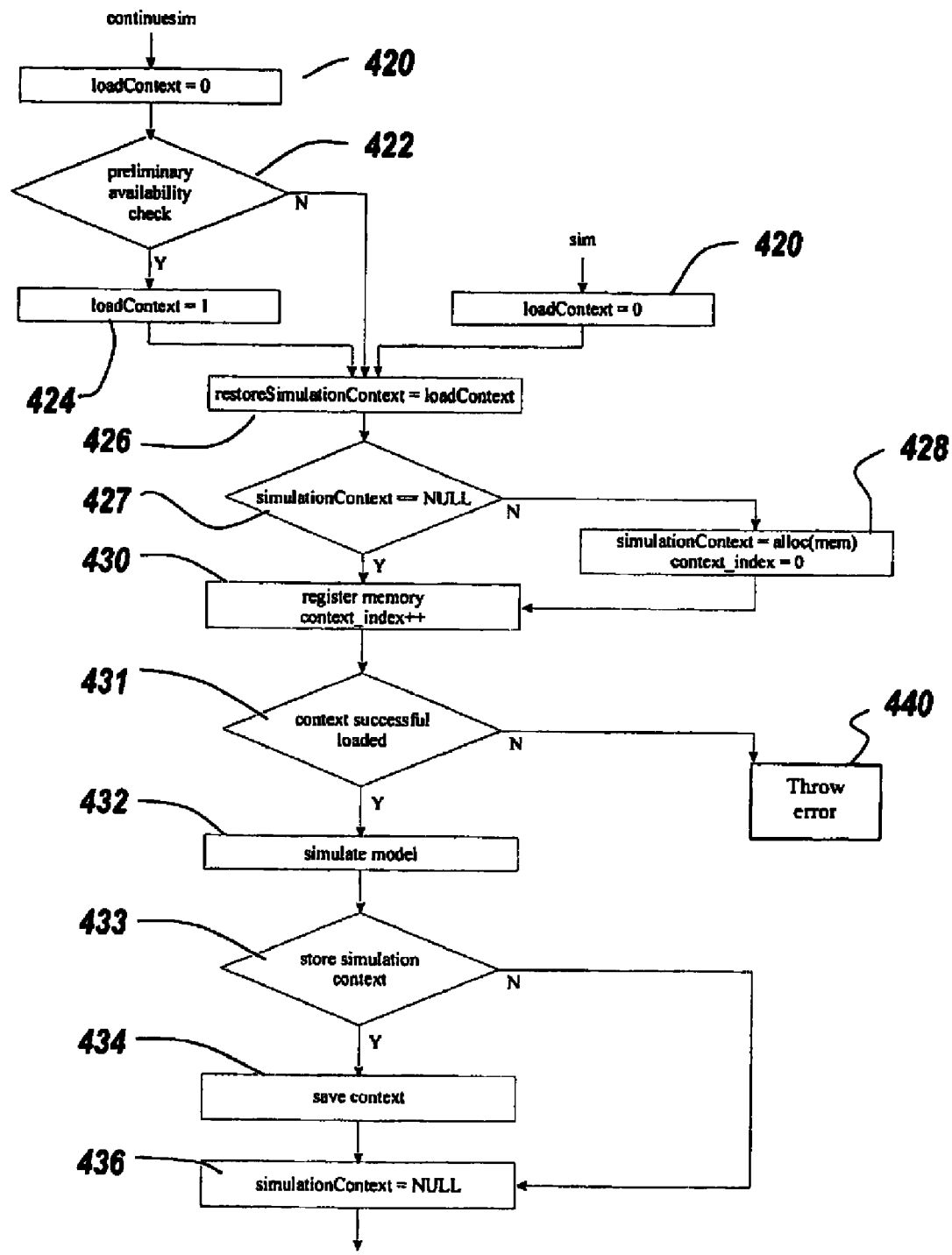
FIG. 27 is a flow chart of the sequence of steps followed by the illustrative embodiment of the present invention to implement the restoration mechanism prior to execution.

The flow chart in FIG. 27 depicts the implementation of the restoration mechanism. The context indexing is initiated when a model attribute simulationContext is not yet set. This is to ensure that when a new simulation run is requested, the originally indexed memory is cleared and reassigned. Otherwise, it would be appended and the same area in memory would be indexed an increasing number of times (related to the number of times a simulation was run). As soon as the context is written to file by slCtxStore, or in case of another exit path (e.g., because of error conditions) simulationContext is reset to indicate that a new simulation run may start.

When a new run is initiated, the first context redirected allocation call resets ContextInitializationComplete, resets the index, and creates the first <address, size> tuple. Consecutive allocation calls then complete the memory index, including the scheme that indexes the parts of context memory that contain references instead of values. This functionality is required at all times (i.e., also when the context is not restored) since it facilitates context storage. A determination is then made as to whether the user requested a simulation continuation, indicated by the loadContext flag. If so, the model checksum that captures the memory map of the model of the stored context is validated and when it complies with the checksum of the model to be simulated, the context is restored. This is important because the model memory map has to be compatible with that of the model used to save the simulation context. The main simulation loop is then executed and when completed the present simulation context is written to file. It should be noted that the context save has to be done before the slDoOutputAndUpdate that follows because in case of a fixed step size, evaluating slDoOutputAndUpdate puts the state of the discrete pulse generator to the next point time, but restart continues from the current point.

FIG. 27 depicts the sequence of steps by which the simulation engine may restore simulation contexts and then execute. The sequence begins with the loadContext variable set to zero (step 420). A determination is made as to whether a stored simulation context is available (step 422). If one is available, the loadContext variable is set to one (step 424). Next, the restoreSimulationContext variable is set to equal the loadContext variable (step 426). If the simulationContext variable is not set (step 427), memory is assigned (step 428). Next, the simulationContext memory is loaded (step 430) and confirmation of the loading is made (step 431). If the loading is not confirmed, an error is thrown (step 440). If the simulation context has been restored, simulation takes place (step 432). The simulation context may be saved following simulation depending upon the user's wishes (step 433) determined either prior to simulation or interactively. If the simulation context is to be saved, it is saved (step 434) and the simulationContext variable reset to NULL (step 436) while freeing the assigned memory. If the simulation context is not being saved, the simulationContext value is still set to NULL (step 436).

Figure 28:
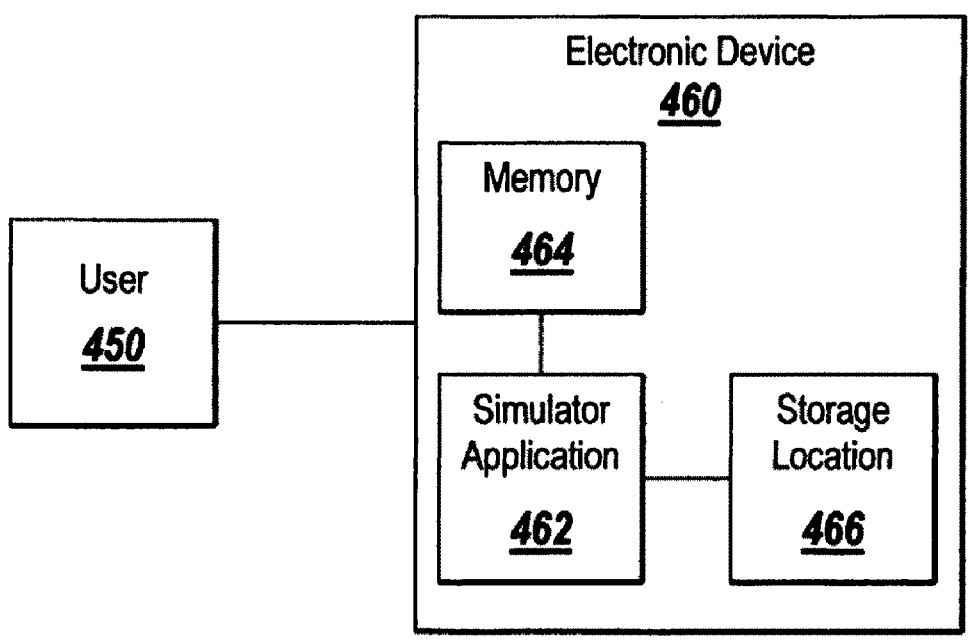
FIG. 28 depicts a block diagram of an environment suitable for practicing the illustrative embodiment of the present invention.

FIG. 28 depicts a block diagram of an environment suitable for practicing the illustrative embodiment of the present invention. A user 450 is interfaced with an electronic device 460. The electronic device 460 includes a simulator application 462, such as Simulink, and non-persistent memory 464. Also included is a persistent storage location 466 such as a hard drive. Simulation contexts may be retrieved from non-persistent memory and stored in the storage location 466. Those skilled in the art will recognize that other implementations such as distributed implementations in which some or all of the user 450, electronic device 460 and memory 464, simulator application 462, and storage location 466 are located remotely from each other are also within the scope of the present invention.

The restored simulation context may be used to run multiple analyses from a common reproducible point to test alternatives. The restored simulation context may be used to run the alternative analyses simultaneously in parallel. The restoration of the simulation context saves significant time over previous simulation methods by ensuring accuracy despite not having to re-run a simulation for transitory or initialization stages of a simulation. Multiple simulation contexts may also be saved from a running simulation without stopping the simulation thus helping in debugging and other types of analysis. The illustrative embodiment of the present invention enables simulation of a wide variety of systems and is not limited to time-based block diagrams.

Since certain changes may be made without departing from the scope of the present invention, it is intended that all matter contained in the above description or shown in the accompanying drawings be interpreted as illustrative and not in a literal sense. Practitioners of the art will realize that the system configurations depicted and described herein are examples of multiple possible system configurations that fall within the scope of the current invention. For example, the present invention may be practiced in other block diagram execution environments such as text based simulation environments. Likewise, the sequence of steps utilized in the illustrative flowcharts are examples and not the exclusive sequence of steps possible within the scope of the present invention.

We claim:

1. A graphical modeling system comprising:
at least one computing device including:
a memory used in a running of a simulation of a model from a zero time point initiating the simulation to a designated time point during the performance of the simulation;
a simulation environment having a mechanism for saving and retrieving simulation state and simulation context associated with a simulation of a time-based model, the mechanism to saving the simulation state and the simulation context at the designated time point, the saved simulation state representing mathematical state values from the simulation at the designated time point, the saved simulation context including at least one of a solver variable or zero crossing information from a time in the simulation prior to the designated time point, the mechanism further retrieving the saved simulation state and simulation context for use in initiating a new simulation; and
a storage location holding the stored simulation state and simulation context; initiating a new simulation, the new simulation using the retrieved simulation context and
a display device displaying a GUI for the simulation environment.

2. The graphical modeling system of claim 1 wherein the mechanism saves the simulation context as a memory dump.

3. The graphical modeling system of claim 1 wherein the mechanism saves the simulation context as a textual dump.

4. The graphical modeling system of claim 1 wherein the mechanism saves the simulation context as a binary dump.

5. The graphical modeling system of claim 1 wherein the simulation environment sets a flag to indicate that the simulation context is to be saved.

6. The graphical modeling system of claim 1 wherein the simulation environment adds a graphical element to the model to indicate that the simulation context is to be saved.

7. The graphical modeling system of claim 1 wherein the simulation environment saves the simulation context in response to an attribute in the model.

8. The graphical modeling system of claim 1 wherein the mechanism saves the simulation state and simulation context at a plurality of points during the simulation execution.

9. The graphical modeling system of claim 1 wherein the mechanism saves the simulation state and simulation context in response to a user-specified condition.

10. The graphical modeling system of claim 1 wherein the mechanism saves the simulation state and simulation context when a steady state is reached in the simulation.

11. The graphical modeling system of claim 1 wherein the mechanism saves the simulation state and simulation context when at least one specified variable in the model attains a specified model value.

12. The graphical modeling system of claim 1 wherein the mechanism saves memory allocations of elements of the simulation context.

13. The graphical modeling system of claim 12 wherein the mechanism uses a localized scheme to save memory allocations wherein the mechanism saves selected variables of an object in the simulation context.

14. The graphical modeling system of claim 12 wherein the mechanism uses a global indexing scheme to save memory allocations wherein the mechanism saving a memory allocation for each of a plurality of selected variables, the mechanism implement a memory allocation function call to save memory allocations with the simulation context.

15. A graphical modeling system, comprising:
a processor configured to: register one or more areas of memory to be used in running a simulation of a time-based model from a zero point initiating the simulation to a designated time point during the performance of the simulation;
execute the time-based model to perform the simulation from the zero point to the designated time point, the designated point being one of a predetermined point chosen prior to simulation and a user-indicated point chosen during simulation;
save, at the designated time point in the simulation, one or more simulation context variables from the registered areas of memory in a storage location configured to hold the simulation context variables, the saved simulation context variables including at least one of a solver variable or zero crossing information from a time in the simulation prior to the designated time point;
retrieve the simulation context variables from the storage location; and
initiate a new simulation, the new simulation using the retrieved simulation context variables.

16. The graphical modeling system of claim 15 the processor is further configured to perform more than one new simulation in parallel using the retrieved simulation context variables.

17. The graphical modeling system of claim 15 wherein the specified point in the simulation is a point at which the simulation reaches a steady state.

18. The graphical modeling system of claim 15 the processor is further configured to store one or more context variables at a plurality of specified points in the simulation.

19. A method comprising:
performing a simulation of a model in a simulation environment, the simulation run from a zero time point initiating the simulation to a designated time point during the performance of the simulation;
saving a simulation context at the designated time point, the saved simulation context including at least one of a solver variable or zero crossing information associated with the simulation from a time in the simulation prior to the designated time point; and
retrieving the saved simulation context to for use initiating a new simulation of the model initiating a new simulation, the new simulation using the retrieved simulation context.

* * * * *